US012784343B2

(12) United States Patent
Langerman et al.

(10) Patent No.: US 12,784,343 B2
(45) Date of Patent: Nov. 3, 2026

(54) THREE-DIMENSIONAL BUILDING MODEL GENERATION BASED ON CLASSIFICATION OF IMAGE ELEMENTS

(71) Applicant: Hover Inc., San Francisco, CA (US)

(72) Inventors: Jack Michael Langerman, San Francisco, CA (US); Ian Endres, San Francisco, CA (US); Dario Rethage, San Francisco, CA (US); Panfeng Li, San Francisco, CA (US)

(73) Assignee: Hover Inc., San Francisco, CA (US)

(*) Notice: Subject to any disclaimer, the term of this patent is extended or adjusted under 35 U.S.C. 154(b) by 145 days.

(21) Appl. No.: 18/703,608

(22) PCT Filed: Oct. 21, 2022

(86) PCT No.: PCT/US2022/078558
§ 371 (c)(1),
(2) Date: Apr. 22, 2024

(87) PCT Pub. No.: WO2023/070115
PCT Pub. Date: Apr. 27, 2023

(65) Prior Publication Data
US 2025/0005853 A1 Jan. 2, 2025

Related U.S. Application Data

(60) Provisional application No. 63/271,197, filed on Oct. 24, 2021.

(51) Int. Cl.
*G06T 17/00* (2006.01)
*G06T 7/11* (2017.01)
(Continued)

(52) U.S. Cl.
CPC ................ *G06T 17/00* (2013.01); *G06T 7/11* (2017.01); *G06T 7/70* (2017.01); *G06V 10/764* (2022.01);
(Continued)

(58) Field of Classification Search
CPC ....................... G06T 17/00; G06T 7/70; G06T 2207/20084; G06V 20/70; G06V 10/764
See application file for complete search history.

(56) References Cited

U.S. PATENT DOCUMENTS

2021/0158615 A1* 5/2021 Porter ..................... G06T 17/05
2021/0243362 A1 8/2021 Castillo et al.

FOREIGN PATENT DOCUMENTS

EP 4420091 8/2024
WO WO 2023/070115 4/2023
WO WO 2023/070115 A1 4/2023

OTHER PUBLICATIONS

Ben-Artzi; Gil, "Epipolar Geometry Based On Line Similarity", Apr. 24, 2017, 2016 23rd International Conference on Pattern Recognition (ICPR), (p. 1865-1869) (Year: 2017).*
Chen; Jia, "Multi-View Triangulation: Systematic Comparison and an Improved Method", Feb. 4, 2020, IEEE Access, (p. 21019) ( Year: 2020).*
(Continued)

*Primary Examiner* — Kee M Tung
*Assistant Examiner* — Alicia Ha
(74) *Attorney, Agent, or Firm* — Knobbe, Martens, Olson & Bear, LLP

(57) ABSTRACT

Methods, storage media, and systems for three-dimensional building model generation based on classification of image elements. An example method includes obtaining images depicting a building, with individual images being taken at individual positions about an exterior of the building, and with the images being associated with camera properties
(Continued)

reflecting extrinsic and/or intrinsic camera parameters. Semantic labels are determined for the images via a machine learning model, with the labels being associated with elements of the building, and with the semantic labels being associated with two-dimensional positions in the images. Three-dimensional positions associated with the plurality of elements are estimated, with estimating being based on one or more epipolar constraints. A three-dimensional representation of at least a portion of the building is generated, with the portion including a roof of the building.

20 Claims, 18 Drawing Sheets

(51) Int. Cl.

| | |
|---|---|
| ***G06T 7/70*** | (2017.01) |
| ***G06V 10/764*** | (2022.01) |
| ***G06V 20/10*** | (2022.01) |
| ***G06V 20/70*** | (2022.01) |

(52) U.S. Cl.
CPC .... *G06V 20/70* (2022.01); *G06T 2207/20084* (2013.01); *G06T 2207/30184* (2013.01)

(56) References Cited

OTHER PUBLICATIONS

Jenson; A.D., "Epipolar Geometry", 2011, (p. 3) (Year: 2011).*
Lindstrom; Peter, "Triangulation Made Easy", Jan. 26, 2010, IEEE Conference on Computer Vision and Pattern Recognition, (p. 3-6) (Year: 2010).*
Merras; Mostafa, "Multi-view 3D reconstruction and modeling of the unknown 3D scenes using genetic algorithms", Dec. 5, 2017, Soft Computing, (p. 6278-6282) (Year: 2017).*
O'Shea; Keiron, "An Introduction to Convolutional Neural Networks", Dec. 2, 2015, arXiv, (p. 1) (Year: 2015).*
Huang et al., "LOD3 Building Reconstruction From Multi-Source Images", The International Archives of the Photogrammetry, Remote Sensing and Spatial Information Sciences, vol. XLIII-B2-2020, Aug. 12, 2020 (Aug. 12, 2020), pp. 427-434, xp093014271, DOI: 10.5194/isprs-archives-XLIII-B2-2020-427-2020, 2020 sect.2 and 3.
International Search Report and Wtitten Oppinion received in International Application No. PCT/US2022/078558, mailed Jan. 24, 2023, 15 pages.
Office Action received in Australian Patent Application No. 2022373777, mailed Jun. 18, 2025, 4 pages.
Notice of Allowance received in Australian Patent Application No. 2022373777, mailed Feb. 9, 2026, 3 pages.

* cited by examiner

THREE-DIMENSIONAL BUILDING MODEL GENERATION BASED ON CLASSIFICATION OF IMAGE ELEMENTS

CROSS-REFERENCE TO RELATED APPLICATIONS

This application claims priority to U.S. Prov. Patent App. No. 63/271,197 titled "SYSTEMS AND METHODS IN 3D RECONSTRUCTION WITHOUT DESCRIPTORS" and filed on Oct. 24, 2021, the disclosure of which is hereby incorporated herein by reference in its entirety.

This application also incorporates by reference the following applications, U.S. patent application Ser. No. 17/118,370, International Application No. PCT/US20/48263, and International Application No. PCT/US22/14164.

BACKGROUND

Technical Field

The present disclosure relates to methods, storage media, and systems for generating a three-dimensional model associated with a building.

Description of Related Art

Three-dimensional models of a building may be generated based on two-dimensional digital images taken of the building. The digital images may be taken via aerial imagery, specialized-camera equipped vehicles, or by a user with a camera from a ground-level perspective when the images meet certain conditions. The three-dimensional building model is a digital representation of the physical, real-world building. An accurate three-dimensional model may be used to derive various building measurements or to estimate design and renovation costs.

However, generating an accurate three-dimensional model of a building from two-dimensional images that are useful for deriving building measurements can require significant time and resources. Current techniques are computationally expensive and prone to false positives and false negatives in feature matching with respect to the two-dimensional digital images used. Thus, the current techniques disallow an end-user from rapidly obtaining such a three-dimensional model.

SUMMARY

One aspect of the present disclosure relates to a method for measuring generating three-dimensional data. The method comprises obtaining a plurality of images depicting a building, wherein individual images are taken at individual positions about an exterior of the building, and wherein the images are associated with camera properties reflecting extrinsic and/or intrinsic camera parameters; determining, via a machine learning model, semantic labels for the images which are associated with a plurality of elements of the building, wherein the semantic labels are associated with two-dimensional positions in the images; estimating three-dimensional positions associated with the plurality of elements, wherein estimating is based on the camera properties and one or more epipolar constraints; and generating a three-dimensional representation of at least a portion of the building with the estimated three-dimensional positions.

One aspect of the present disclosure relates to a system comprising one or more processors and non-transitory computer storage media storing instructions that when executed by the one or more processors, cause the processors to perform operations. The operations comprise obtaining a plurality of images depicting a building, wherein individual images are taken at individual positions about an exterior of the building, and wherein the images are associated with camera properties reflecting extrinsic and/or intrinsic camera parameters; determining, via a machine learning model, semantic labels for the images which are associated with a plurality of elements of the building, wherein the semantic labels are associated with two-dimensional positions in the images; estimating three-dimensional positions associated with the plurality of elements, wherein estimating is based on the camera properties and one or more epipolar constraints; and generating a three-dimensional representation of at least a portion of the building, with the estimated three-dimensional positions.

One aspect of the present disclosure relates to non-transitory computer storage media storing instructions that when executed by a system of one or more processors, cause the processors to perform operations. The operations comprise obtaining a plurality of images depicting a building, wherein individual images are taken at individual positions about an exterior of the building, and wherein the images are associated with camera properties reflecting extrinsic and/or intrinsic camera parameters; determining, via a machine learning model, semantic labels for the images which are associated with a plurality of elements of the building, wherein the semantic labels are associated with two-dimensional positions in the images; estimating three-dimensional positions associated with the plurality of elements, wherein estimating is based on the camera properties and one or more epipolar constraints; and generating a three-dimensional representation of at least a portion of the building with the estimated three-dimensional positions.

One aspect of the present disclosure relates to a method for confirming a semantic label prediction in an image. The method comprises obtaining a plurality of images depicting a scene, wherein individual images comprise co-visible aspects with at least one other image in the plurality of images, and wherein the images are associated with camera properties reflecting extrinsic and/or intrinsic camera parameters; determining, via a machine learning model, semantic labels for the images which are associated with a plurality of elements of the scene, wherein the semantic labels are associated with two-dimensional positions in the images; and validating a first semantic label in a first image by satisfying an epipolar constraint of the first semantic label according to the first semantic label in a second image and satisfying the epipolar constraint of the first semantic label in the second image according to the first semantic label in the first image.

One aspect of the present disclosure relates to non-transitory computer storage media storing instructions that when executed by a system of one or more processors, cause the processors to perform operations. The operations comprise obtaining a plurality of images depicting a scene, wherein individual images comprise co-visible aspects with at least one other image in the plurality of images, and wherein the images are associated with camera properties reflecting extrinsic and/or intrinsic camera parameters; determining, via a machine learning model, semantic labels for the images which are associated with a plurality of elements of the scene, wherein the semantic labels are associated with two-dimensional positions in the images; and validating a first semantic label in a first image by satisfying an epipolar constraint of the first semantic label according to the first semantic label in a second image and satisfying the epipolar constraint of the first semantic label in the second image according to the first semantic label in the first image.

One aspect of the present disclosure relates to a method for generating three-dimensional data. The method comprises obtaining a plurality of images depicting an object, wherein individual images are taken at individual positions about the object, and wherein the images are associated with camera properties reflecting extrinsic or intrinsic camera parameters; determining, via a machine learning model, semantic labels for the images which are associated with a plurality of elements of the object, wherein the semantic labels are associated with two-dimensional positions in the images; estimating three-dimensional positions associated with the plurality of elements, wherein estimating is based on camera properties of a selected camera pair from the plurality of images validated by a visual property of an image associated with a nonselected camera from the plurality of images and one or more epipolar constraints; and generating a three-dimensional representation of at least a portion of the object with the estimated three-dimensional positions.

One aspect of the present disclosure relates to one or more non-transitory storage media storing instructions that when executed by a system of one or more processors, cause the processors to perform operations. The operations comprise obtaining a plurality of images depicting an object, wherein individual images are taken at individual positions about the object, and wherein the images are associated with camera properties reflecting extrinsic and/or intrinsic camera parameters; determining, via a machine learning model, semantic labels for the images which are associated with a plurality of elements of the object, wherein the semantic labels are associated with two-dimensional positions in the images; estimating three-dimensional positions associated with the plurality of elements, wherein estimating is based on camera properties of a selected camera pair from the plurality of images validated by a visual property of an image associated with a nonselected camera from the plurality of images and one or more epipolar constraints; and generating a three-dimensional representation of at least a portion of the object with the estimated three-dimensional positions.

These and other features, and characteristics of the present technology, as well as the methods of operation and functions of the related elements of structure and the combination of parts and economics of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

Figure 1:
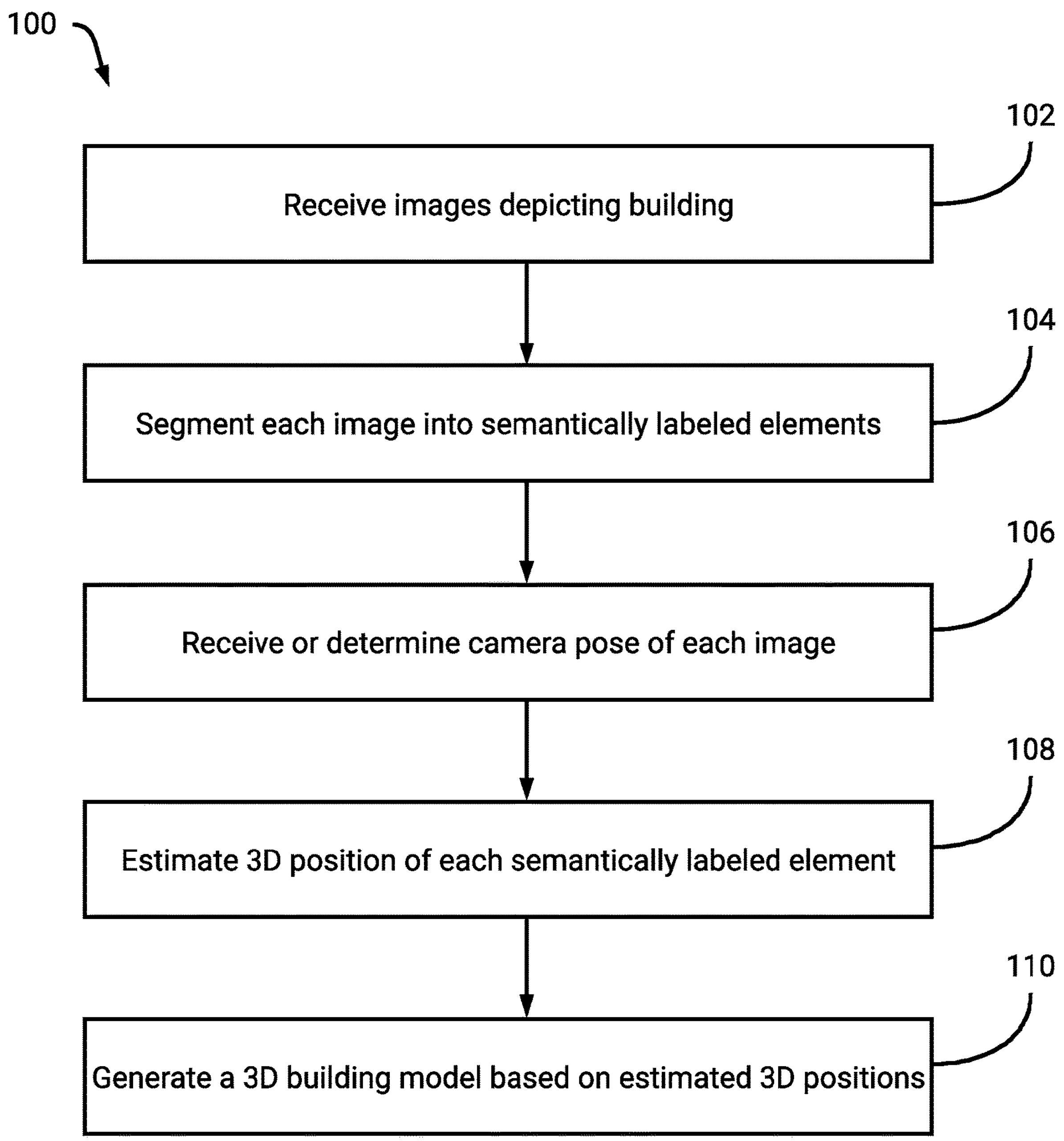
FIG. 1 is a flowchart of an example process for generating a three-dimensional (3D) building model, according to some embodiments.
Figure 2A:
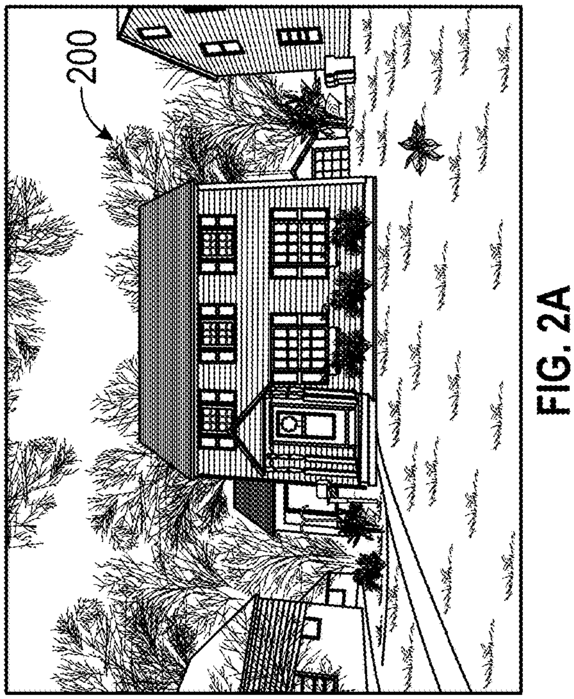
FIGS. 2A-2D illustrate image data of example images, according to some embodiments.
Figure 2B:
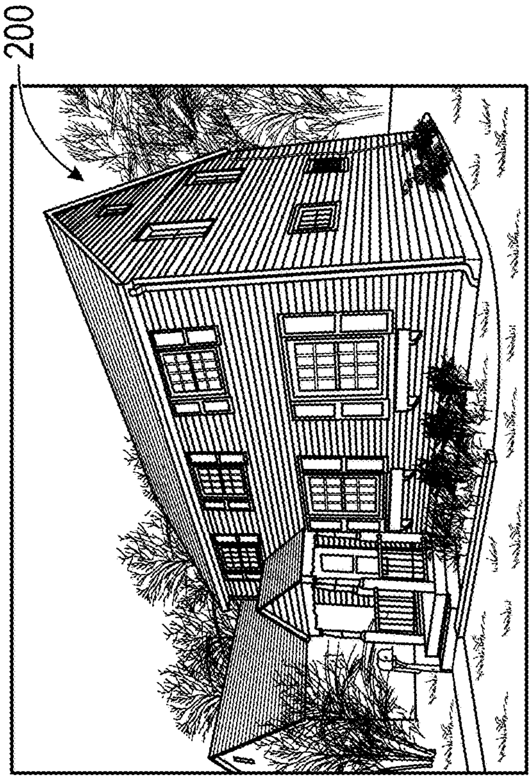
Figure 2C:
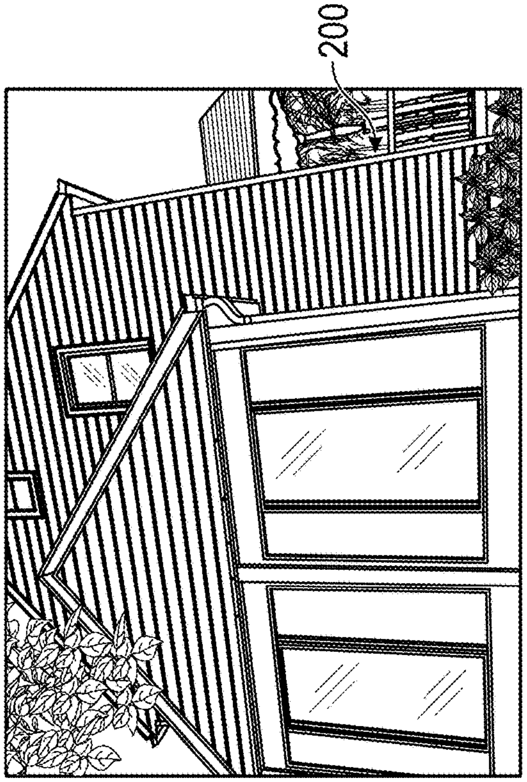
Figure 2D:
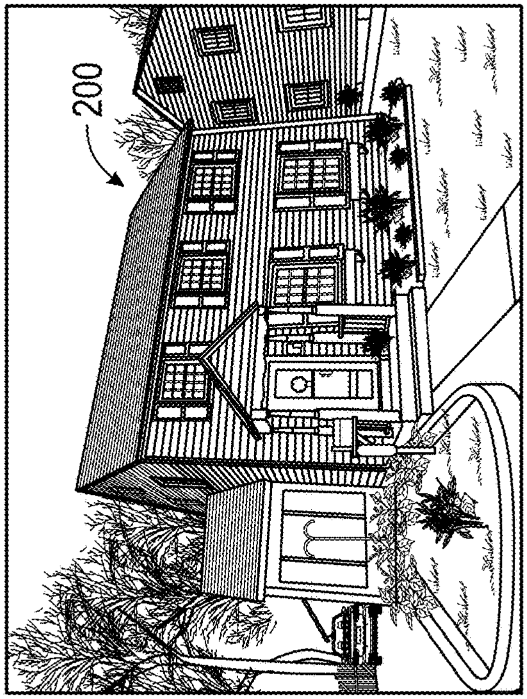

In the following description, for the purposes of explanation, numerous specific details are set forth in order to provide a thorough understanding of the present disclosure. It will be appreciated, however, that the present disclosure may be practiced without these specific details. In other instances, well-known structures and devices are shown in block diagram form in order to avoid unnecessarily obscuring the present disclosure.

DETAILED DESCRIPTION

This specification describes techniques to generate a three-dimensional model of at least a portion of a building, such as a home or other dwelling. As used herein, the term building refers to any three-dimensional object, man-made or natural. Buildings may include, for example, houses, offices, warehouses, factories, arenas, and so on. As will be described, images of the building may be obtained, such as via a user device (e.g., a smartphone, tablet, camera), as an end-user moves about an exterior of the building. Thus, the images be taken from different vantage points about the building. Analysis techniques, such as machine learning techniques, may then be used to label elements depicted in the images. Example elements may include roof elements such as caves, ridges, rakes, and so on. Correspondences between depictions of these elements may then be used to generate the three-dimensional model. As will be described, the model may be analyzed to inform building measurements (e.g., roof facet pitch, roof facet area, and so on).

One example technique to generate three-dimensional models of buildings relies upon matching features between images using descriptor-based matching. For this example technique, descriptors such as scale-invariant feature transform (SIFT) descriptors may be used to detect certain elements in the images. These SIFT descriptors may then be matched between images to identify portions of the images which are similar in appearance.

As may be appreciated, there may be distinctions in the appearance of a same building-element (e.g., an apex of a roof) in images due to variations in the image viewpoint, variations in lighting, and so on. Due to these distinctions, incorrect matches may be identified. Additionally, there may be a multitude of candidate matches with no clear way to identify a correct match. Using such descriptor-based matching may therefore require substantial post-processing techniques to filter incorrect matches. Since descriptor-based matching relies upon appearance-based matching, descriptor-based matching may be an inflexible technique to determine correspondence between images which may lead to inaccuracies in three-dimensional model generation.

In contrast, the techniques described herein leverage a machine learning model to classify, or otherwise label, building-specific elements in images. For example, the machine learning model may be trained to output building-specific labels to portions of an input image. As an example, a forward pass through the machine learning model may output a two-dimensional image position associated with a particular class. As another example, the model may output a bounding box about a portion of an image which is associated with a class. As another example, the output may reflect an assignment of one or more image pixels as forming part of a depiction of a building-specific element. As another example, the machine learning model may generate a mask which identifies a building-specific element (e.g., a contour or outline of the element).

Since the machine learning model may be trained using thousands or millions of training images and labels, the model may be resilient to differences in appearances of building-specific elements. Additionally, the machine learning model may accurately label the same building-specific element across images with lighting differences, differences in perspective, and so on. In this way, the labels may represent viewpoint invariant descriptors which may reliably characterize portions of images as depicting specific building-specific elements.

Due to complexity of certain buildings, such as the complexity of roofs with multiple roof facets, there may be a multitude of a certain type of building-specific element depicted in an image. Thus, when identifying and matching a location of a building-specific element in the image with another location of the element in a different image, there may be multiple potential label matches. As will be described, epipolar matching may be utilized to refine the potential label matches. For example, the epipolar matching may use intrinsic and/or extrinsic camera parameters associated with the images. In this example, the same building-specific element may be identified between images using epipolar geometry.

In some embodiments, there may be a substantial number of images of a building. For example, there may be 4, 5, 7, 12, and so on, images of the building taken at various positions about the exterior of the building. A subset of the images may depict the same building-specific element. For example, a particular roof feature may be visible in the front of building, with the subset depicting the front. To determine a three-dimensional location of the building-specific element, and as will be described, a reprojection technique may employed. For example, a three-dimensional location for the element may be determined using a first image pair of the subset. This location may then be reprojected into remaining images of the subset. As an example, the location may be identified in a third image of the subset. A reprojection error may then be determined between that location in the third image and a portion of the third image labeled as depicting the element. Similarly, reprojection errors may be determined for all, or a portion of, the remaining images in the subset.

A sum, or combination, of the above-described reprojection errors may be determined for each image pair. That is, the sum may reflect the reprojection error associated with a three-dimensional location of a particular building-specific element as determined from each image pair. In some embodiments, the image pair, and thus three-dimensional location of the element, associated with the lowest reprojection error may be selected for the three-dimensional model In this way, three-dimensional locations of building-specific elements may be determined. The elements may be connected, in some embodiments, to form the three-dimensional model of at least a portion of the building. In some embodiments, logic (e.g., domain specific logic associated with buildings) may be used. As an example, a system may form a roof ridge as connecting two apex points. As another example, the system may connect an eave between two eave end points. As another example, in some embodiments, an eave or ridge line may have no, or a small, z-axis change. Thus, if an eave or ridge line has an angle the system may cancel it (e.g., remove it) from the model. Optionally, camera information may be used to align the model geometry. For example, the z-axis may correspond to a gravity vector.

The above and additional disclosure will now be described in more detail.

Three-dimensional (3D) Building Model Generation

FIG. 1 is a flowchart of an example process 100 for generating a three-dimensional (3D) building model, according to some embodiments. For convenience, the process 100 will be described as being performed by a system of one or more computers or a system of one or more processors.

At block 102, one or more images are received or accessed. As described above, the images may depict an exterior of a building (e.g., a home). The images may be obtained from cameras positioned at different locations, or differently angled at a same location, about the exterior. For example, the images may depict a substantially 360-degree view of the building. As another example, the images may depict a front portion of the building from different angles. The images may optionally be from a similar distance to the building, such as a center of the building (e.g., the images may be obtained from a circle surrounding the building). The images may also be from different distances to the building, such as illustrated in FIGS. 2A-2D. In some embodiments, the images can depict, at least in part, an interior of the building.

A data capture device, such as a smartphone or a tablet computer, can capture the images. Other examples of data capture devices include drones and aircraft. The images can include ground-level images, aerial images, or both. The aerial images can include orthogonal images, oblique images, or both. The images can be stored in memory or in storage.

The images, in some embodiments, may include information related to camera extrinsics (e.g., pose of the data capture device, including position and orientation, at the time of image capture), camera intrinsics (e.g., camera constant, scale difference, focal length, and principal point), or both. The images can include image data (e.g., color information) and depth data (e.g., depth information). The image data can be from an image sensor, such as a charge coupled device (CCD) sensor or a complementary metaloxide semiconductor (CMOS) sensor, embedded within the data capture device. The depth data can be from a depth sensor, such as a LiDAR sensor or time-of-flight sensor, embedded within the data capture device.

FIGS. 2A-2D illustrate example images which depict a building 200. These images depict the building 200 from a different perspective. In other words, the data capture device associated with the example images have different poses (positions and orientations). As illustrated, FIG. 2A was taken at a further distance, or a shorter focal length, than FIG. 2C. Using the intrinsic and/or extrinsic camera parameters, the system described herein may generate the three-dimensional model while taking into account such distinctions in distance, focal length, and so on.

Referring back to FIG. 1, at block 104 the system segments each image into one or more classifications (e.g., semantically labeled elements). For example, each image is segmented to classify pixels into trained categories, such as, for example, the building structure, sub-structures, architectural features, or architectural sub-features. Examples of sub-structures include gables, roofs, and the like. Examples of architectural features include eaves, ridges, rakes, posts, fascia, soffits, windows, and the like. Examples of architectural sub-features include cave end points, ridge end points, apexes, posts, ground lines, and the like.

The segmented image can include one or more semantically labeled elements which describe a two-dimensional (2D) position (e.g., X, Y). For example, the 2D position of a roof apex may be determined. As another example, the 2D positions associated with an cave or ridge may be determined. In some embodiments, the 2D positions may represent cave endpoints of an eave (e.g., cave line or segment) or ridge endpoints of a ridge (e.g., a ridge line or segment). The labeled elements can also describe a segment (e.g., (X1, Y1) to (X2, Y2)), or polygon (e.g., area) for classified elements within the image, and associated classes (e.g., data related to the classified elements). Thus, for certain element classes the segmentation may indicate two-dimensional positions associated with locations of the element classes. As an example, and as described above, an element class may include an cave point (e.g., cave endpoint). For this example, the two-dimensional location of the cave point may be determined (e.g., a center of a bounding box about the cave point). For other element classes the segmentation may indicate a segment and/or area (e.g., portion of an image). For example, a gable may be segmented as a segment in some embodiments. As another example, a window may be segmented as an image area.

In some embodiments, each semantically labeled element is a viewpoint invariant descriptor when such element is visible across multiple images and is appropriately constrained by rotational relationships such as epipolar geometry. In some embodiments, each semantically labeled element can include a probability or confidence metric that describes the likelihood that the semantically labeled element belongs to the associated class.

As will be described, a machine learning model may be used to effectuate the segmentation. For example, the machine learning model may include a convolutional neural network which is trained to label portions of images according to the above-described classifications. The system may compute a forward pass through the model and obtain output reflecting the segmentation of the image into different classifications. As described above, the output may indicate a bounding box about a particular classified element. The output may also identify pixels which are assigned as forming a particular classified element. The output, in some embodiments, may be an image or segmentation mask which identifies the particular classified element.

Figure 3:
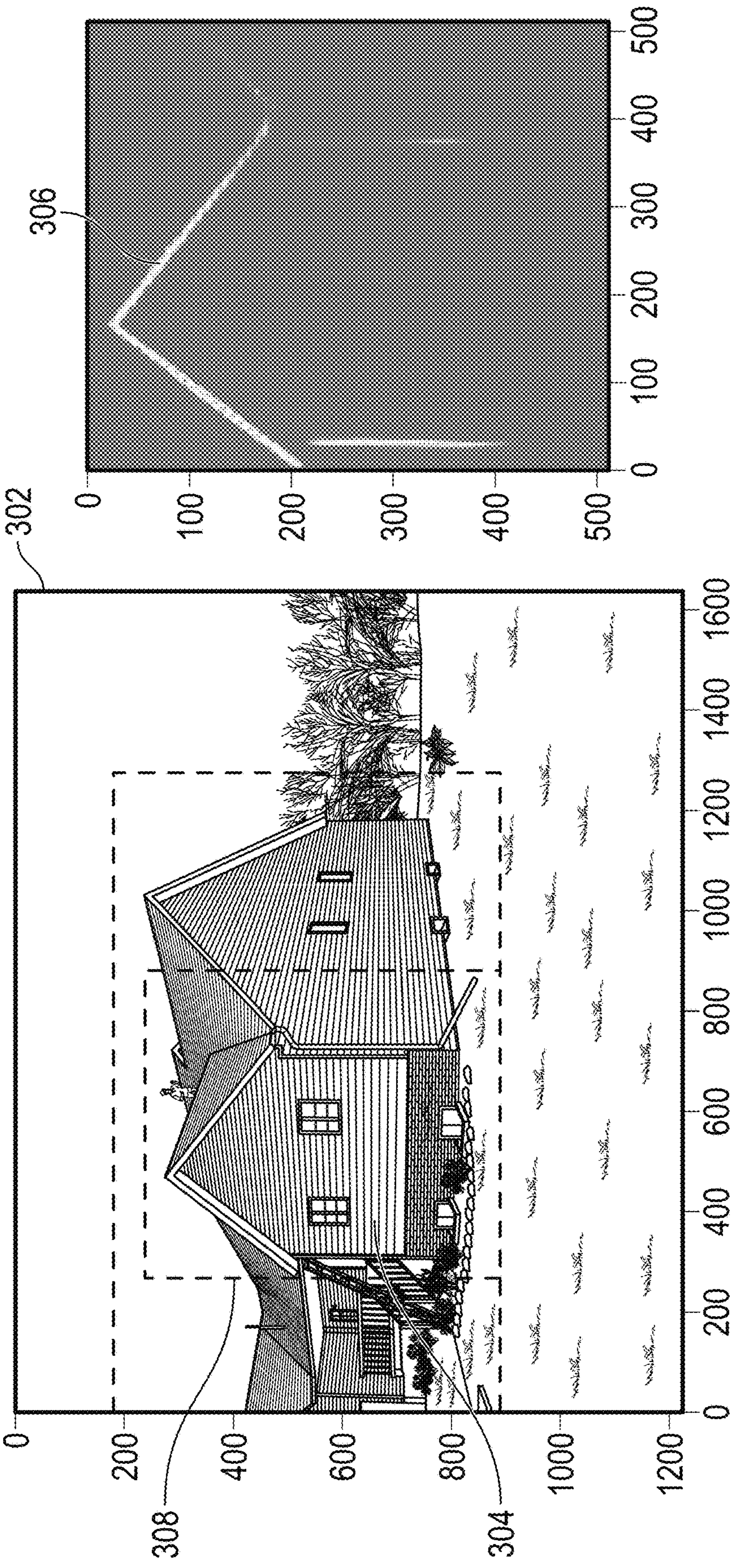
FIG. 3 illustrates a channel output for a sub-structure, according to some embodiments.

FIG. 3 illustrates an example segmentation mask 306 for a gable of a house 304. A bounding box that encompasses the segmentation mask 306 may in turn produce a bounding box 308. The segmentation mask 306 is the output of one or more of a plurality of segmentation channels that may be produced from an input image (e.g., RGB image) as seen in image frame 302. A first channel may be segmentation for the house 304 (e.g., the building structure) on the whole, another channel for the gable (e.g., a sub-structure) as in the segmentation mask 306. Some embodiments identify additional channels defining additional features, sub-features, or subcomponents.

Figure 4:
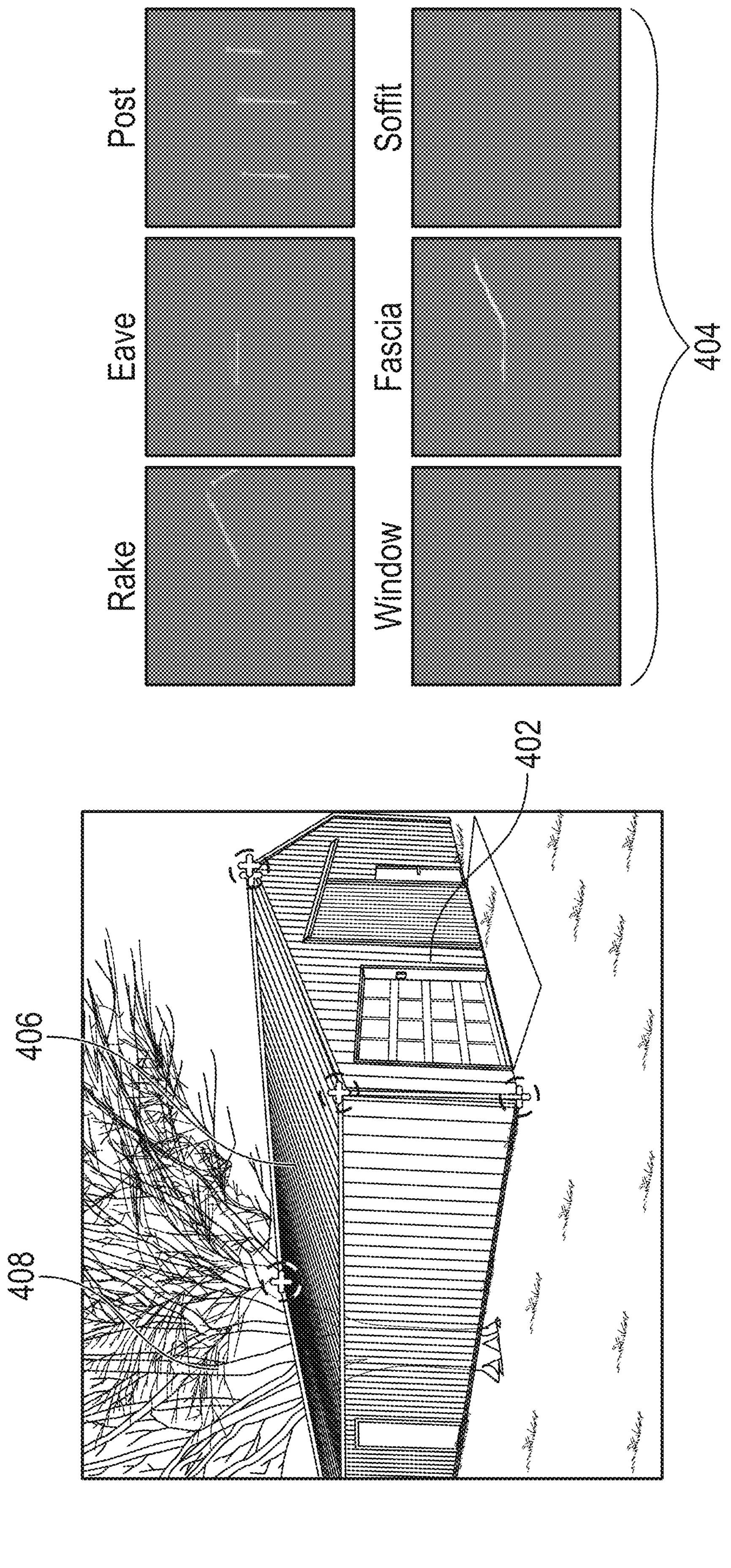
FIG. 4 illustrates a plurality of channels associated with activation maps, according to some embodiments.

FIG. 4 illustrates an image of a building 402 with a plurality of segmentation channels 404. The segmentation channels are configured to display segmented elements as predicted from one or more activation maps associated with the segmentation channels, as described more fully below with reference to FIG. 7A. In some embodiments, a channel represents a classification output indicative of a pixel value for a specific attribute in an image; a segmentation mask for a particular feature may be a type of channel. A channel may have no output, for example, the "window channel" of segmentation channels 404 comprises no predicted elements as building 402 as shown in the image has no windows.

Among the segmentation channels 404 are rakes (e.g., lines culminating in apexes on roofs), eaves (e.g., lines running along roof edges distal to a roof's ridge), posts (e.g., vertical lines of facades such as at structure corners), fascia (e.g., structural elements following eaves), and soffit (e.g., the surface of a fascia that faces the ground). Many more sub-elements and therefore channels are possible, such as ridge lines, apex points, and surfaces are part of a non-exhaustive list.

In some embodiments, the segmentation channels may be aggregated. For example, knowing that a sub-structure such as a gable is a geometric or structural representation of architectural features such as rakes and posts, a new channel may be built that is a summation of the output of the rake channel and the post channel, resulting in a representation similar to mask 306 of FIG. 3. Similarly, if there is not already a roof channel, knowing that roofs are a geometric or structural representation of rakes, caves, and ridges, those channels may be aggregated to form a roof channel. In some embodiments, a cascade of channel creation or selection may be established. While a single channel for a building structure on the whole may be, as an example, a preferred channel, a second channel category may be for sub-structures such as a gable or roof, and a third channel category may be for the foundational elements of sub-structures such as architectural features like rakes, caves, posts, fascia, soffits, windows, etc.

In some embodiments, a channel is associated with an activation map for data in an image (pre- or post-capture) indicating a model's prediction that a pixel in the image is attributable to a particular classification of a broader segmentation mask. The activation maps are, then, an inverse function of a segmentation mask trained for multiple classifications. By selectively isolating or combining single activation maps, new semantic information, masks, and bounding boxes can be created for sub-structures or sub-features in the scene within the image.

As described above, a machine learning model may be used to segment an image. For example, a neural network may be used. In some embodiments, the neural network may be a convolutional neural network which includes a multitude of convolutional layers optionally followed by one or more fully-connected layers. The neural network may effectuate the segmentation, such as via outputting channels or subchannels associated with individual classifications.

Use of a neural network enables representations across an input image to influence prediction of related classifications, while still maintaining one or more layers, or combinations of filters or kernels, which are optimized for a specific classification. In other words, a joint prediction of multiple classes is enabled by this system. While the presence of points and lines within an image can be detected, shared representations across the network's layers can lend to more specific predictions; for example, two apex points connected by lines can predict or infer a rake more directly with the spatial context of the constituent features. In some embodiments, each subchannel in the final layer output is compared during training to a ground truth image of those same classified labels and any error in each subchannel is propagated back through the network. This results in a trained model that outputs N channels of segmentation masks corresponding to target labels of the aggregate mask. Merely for illustrative purposes, the six masks depicted among the segmentation channels 404 reflect a six-classification output of such a trained model.

In some embodiments, output from the machine learning model is further refined using filtering techniques. Keypoint detection such as Harris corner algorithm, line detection such as Hough transforms, or surface detections such as concave hull techniques can clean noisy output.

Figure 5A:
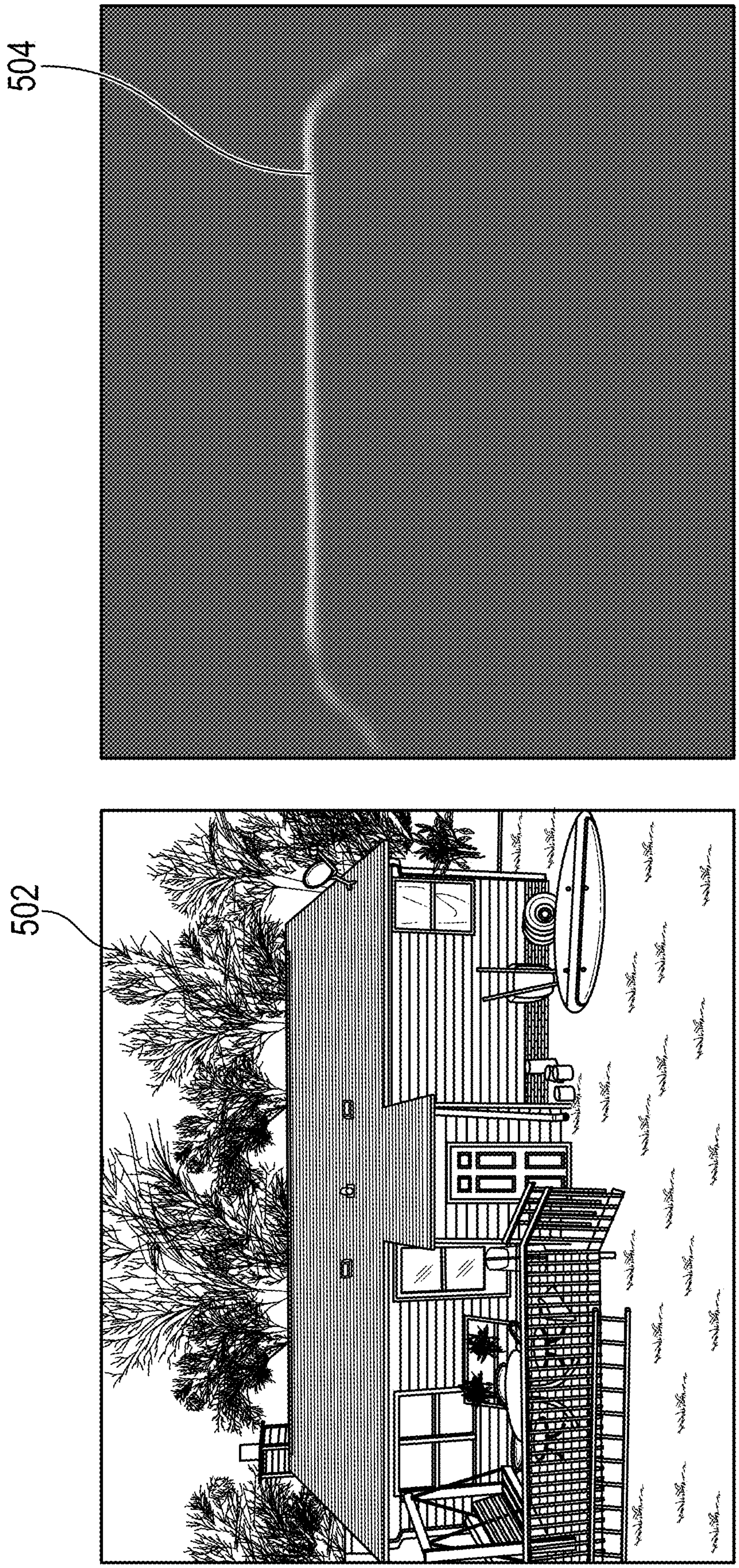
FIGS. 5A-6B illustrate scene understanding for images, according to some embodiments.
Figure 5B:
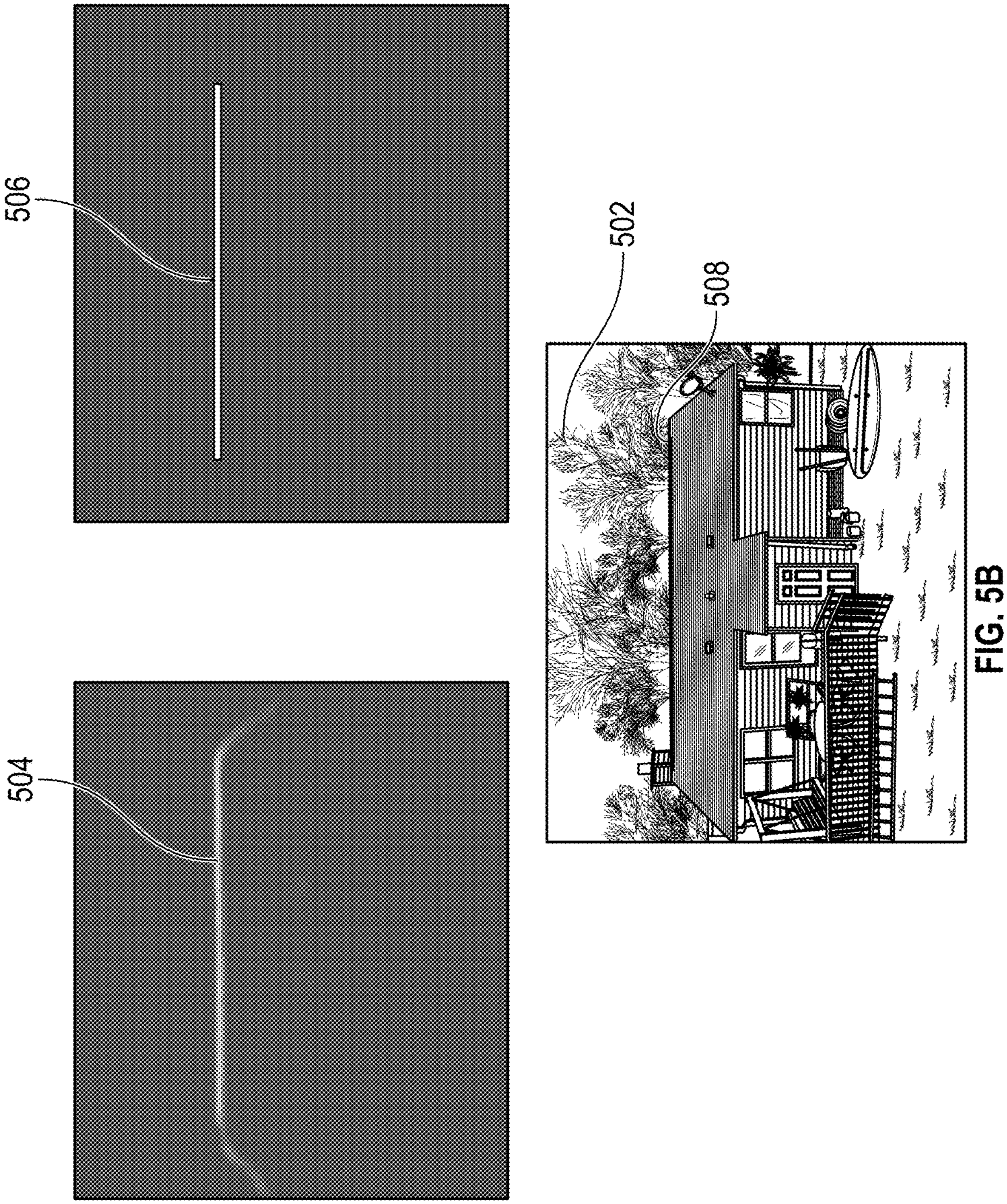

Referring to FIG. 5A, a segmented element 504 (e.g., a ridge line for a roof) is depicted as being generated from input image 502. As the segmented element 504 corresponds to a linear feature, which may be known via domain specific logic associated with buildings, a linear detection technique may be applied to the pixels of the segmented element 504, resulting in smoothed linear feature 506 of FIG. 5B. This linear feature may then be overlaid on the image 502 to depict a clean semantic labeling 508.

As discussed above, the segmented element 504 output may be grouped with other such elements or refined representations and applied to a scene. Grouping logic is configurable for desired sub-structures or architectural features or architectural sub features. For example, a rake output combined with a post output can produce a gable output, despite no specific output for that type of sub-structure.

Referring back to FIG. 4, such configurable outputs (e.g., channels) can create clean overlays indicative of a classification but which are not prone to noisy pixel prediction or occlusions. A roof overlay 406 may be created from a refined planar surface activation mask, or by filling in areas bounded by apex points, rakes, cave, and ridge line activation masks. An occluding tree 408 does not create neighbor masks for the same planar element with such a cumulative channel derived from several activation mask outputs. In other words, prediction for roof pixels does not produce a multitude of roof masks in a single image, where each of the plurality of roof masks is broken or interrupted from neighboring roof pixel predictions by the occluding object.

Figure 6A:
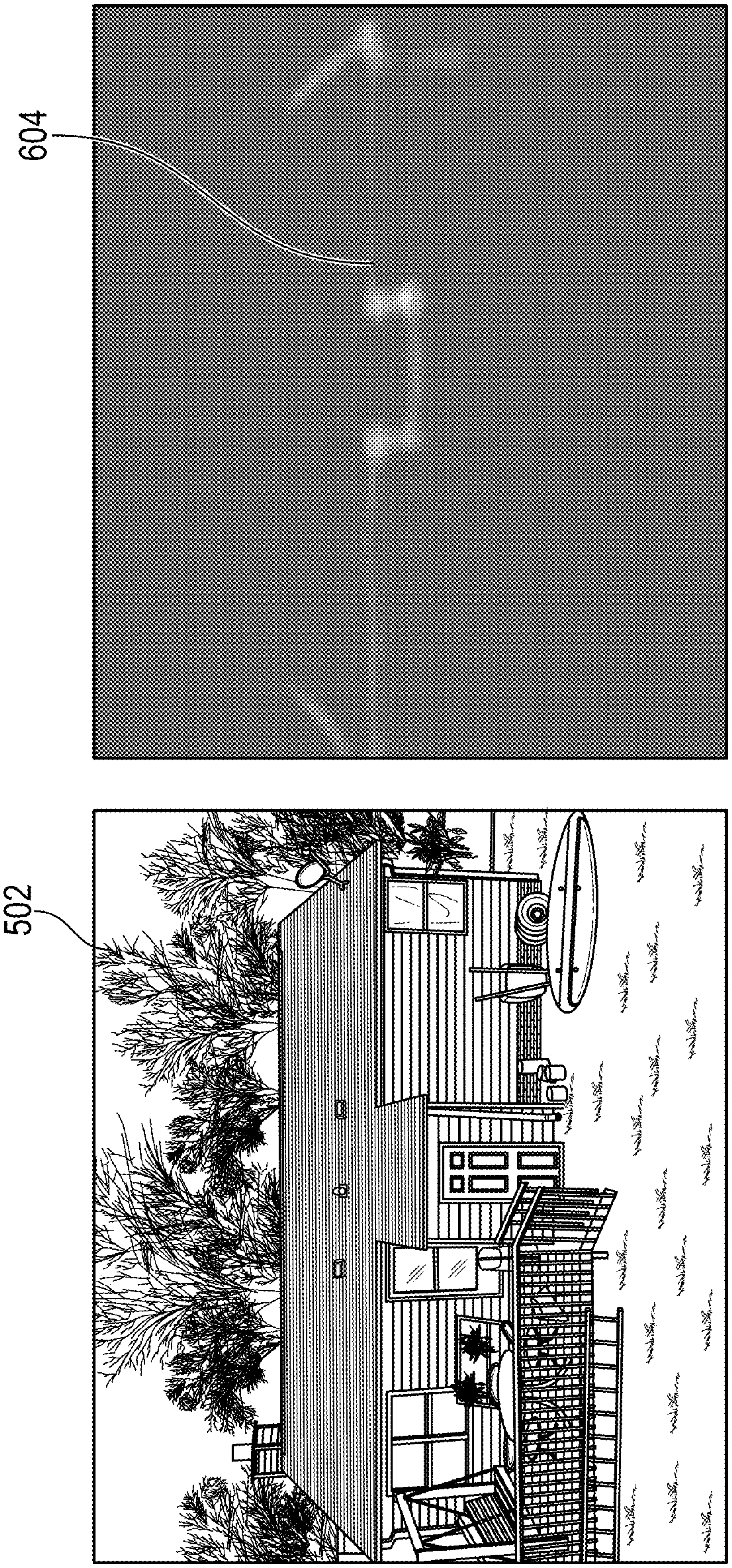
Figure 6B:
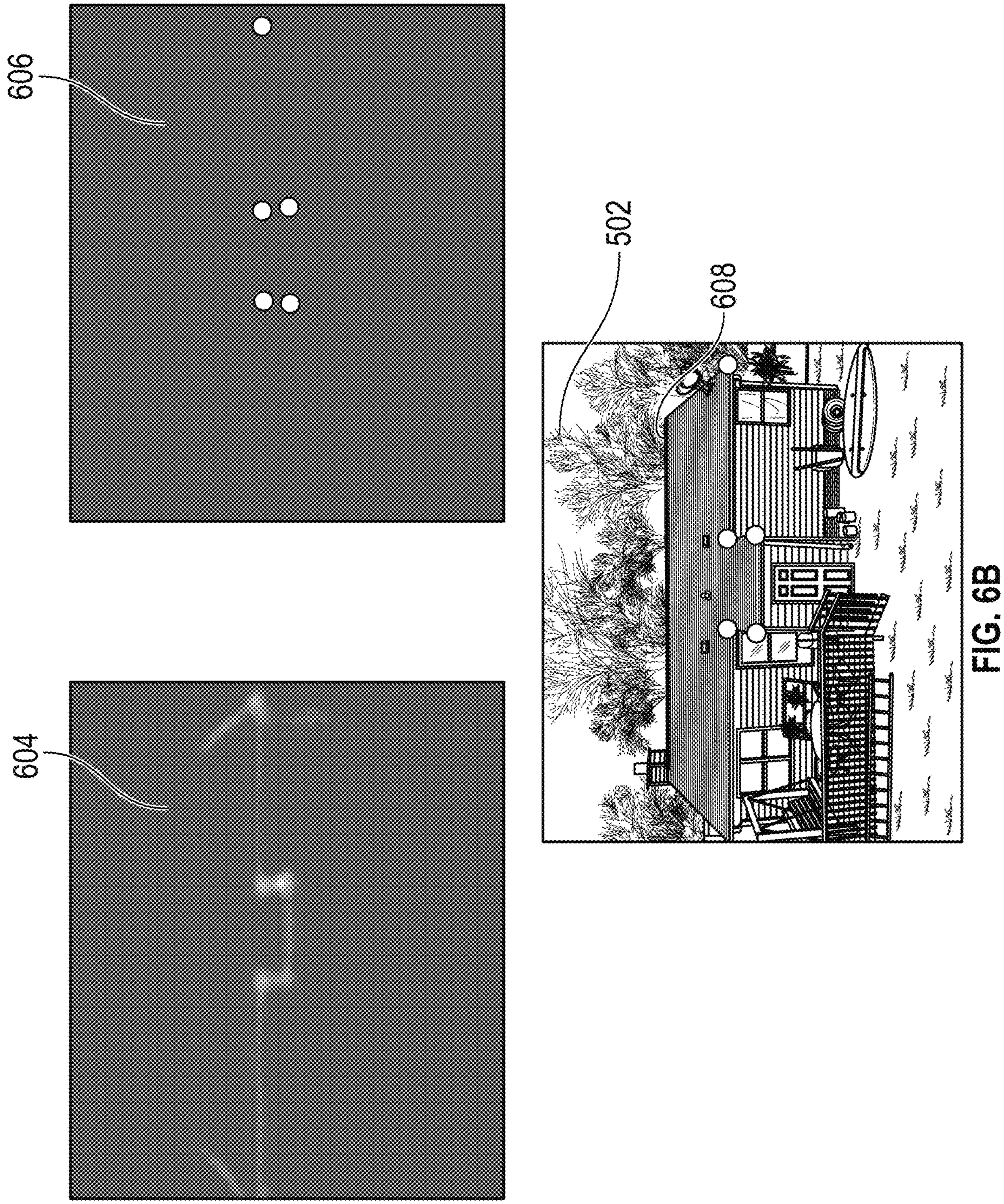

As another illustrative example, FIG. 6A depicts the same input image 502 as in FIG. 5A but with a segmented element 604 corresponding to the fascia of the building. While linear detection techniques which are operated upon the element 604 may produce clean lines to the noisy element 604, other techniques such as keypoint detection by Harris corner detection can reveal, such as shown in FIG. 6B, a fascia endpoint channel 606 that show semantic point labeling 608. These channels can be applied in building block like fashion to provide clean labeling to an image that overlays a structure, even over occlusions as described above with FIG. 4 and mitigating the presence of the occluding tree 408.

Figure 7A:
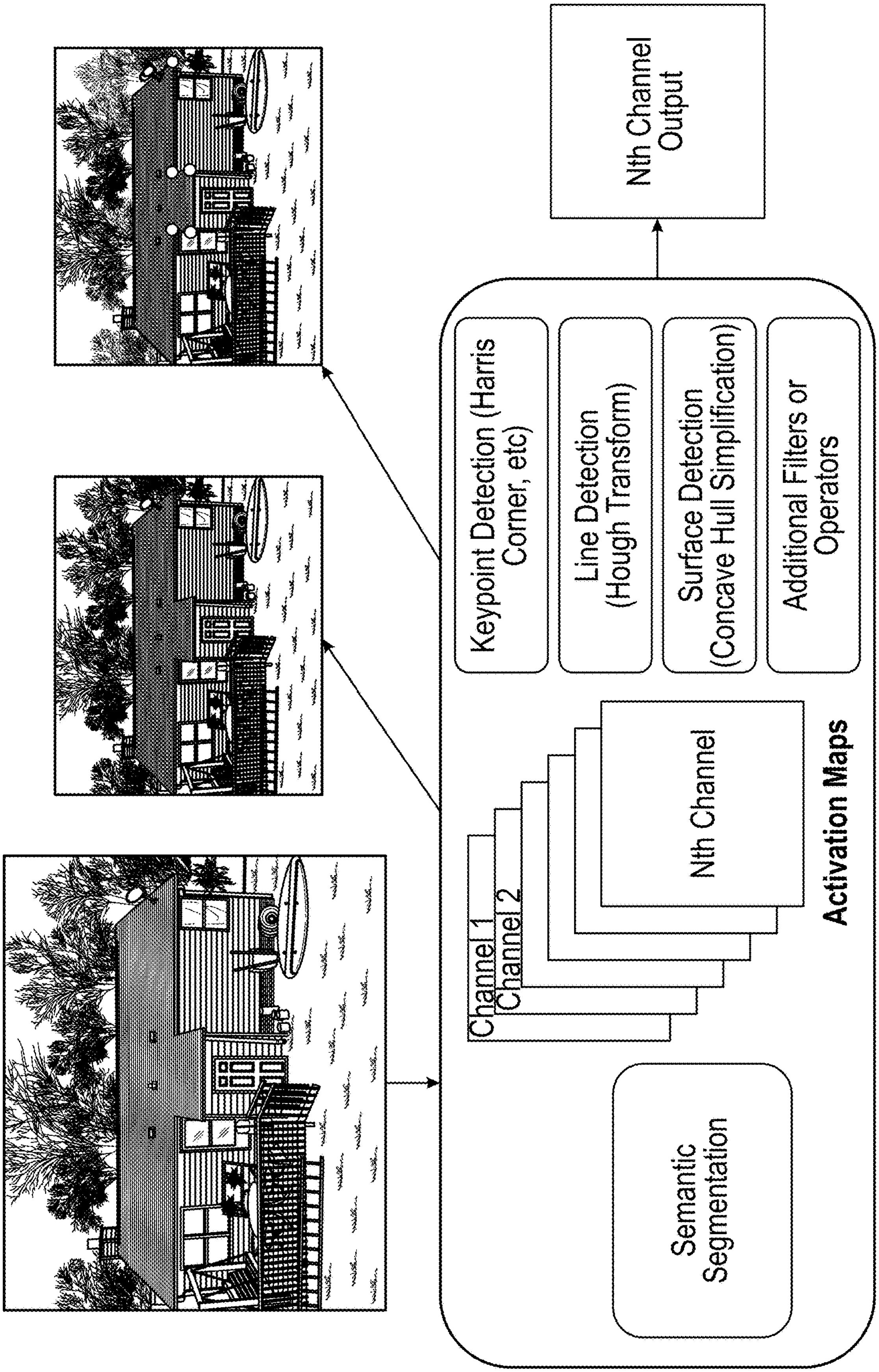
FIGS. 7A-7B illustrate operations for generating channel output for substructure identification, according to some embodiments.
Figure 7B:
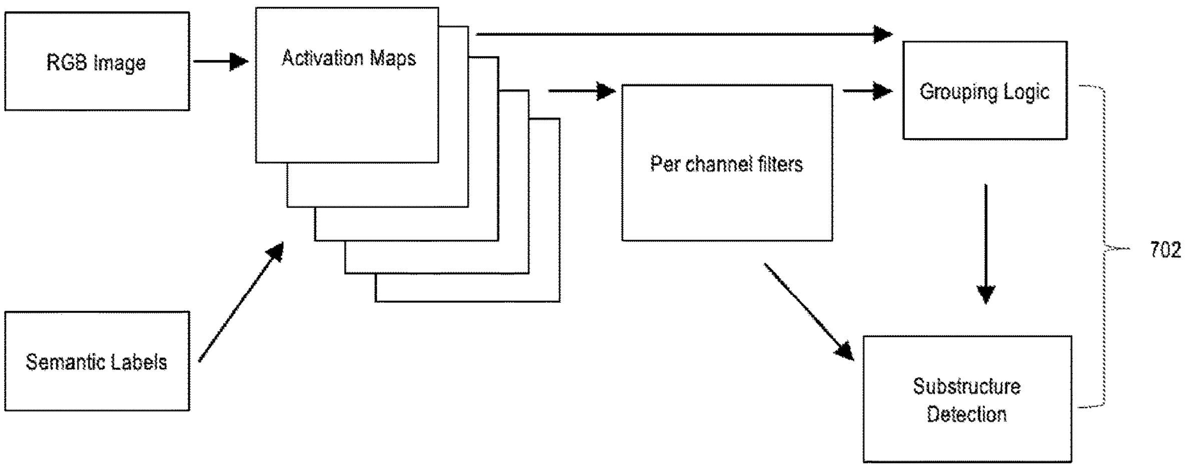

FIG. 7A illustrates this semantic scene understanding output from element-specific channels, wherein an input image is segmented for a plurality of N classification channels, and each classification extracted by a respective activation map. The activation map output may be further refined according to computer vision techniques applied as channel operators like keypoint detection, line detection or similar functions, though this step is not required. In some embodiments, a channel operator aggregates multiple channels. These grouped or aggregated channel outputs create higher order sub-structure or architectural feature channels based on the lower order activation map or channels for the input subject. In some embodiments, bounding boxes are fit to the resultant segmentation mask of lower order constituent channels or higher order aggregate channels as in blocks 702 of FIG. 7B.

In some embodiments, grouping of architectural features or architectural sub-features may be configurable or automated. Users may select broad categories for groups (such as gable or roof) or configure unique groups based on use case. As the activation maps represent low order components, configuration of unique groups comprising basic elements, even structurally unrelated elements, can enable more responsive use cases. Automated grouping logic may be done with additional machine learning techniques. Given a set of predicted geometric constraints, such as lines or points generally or classified lines or points, a trained neural network can output grouped structures (e.g., primitives) or sub-structures.

Figure 8:
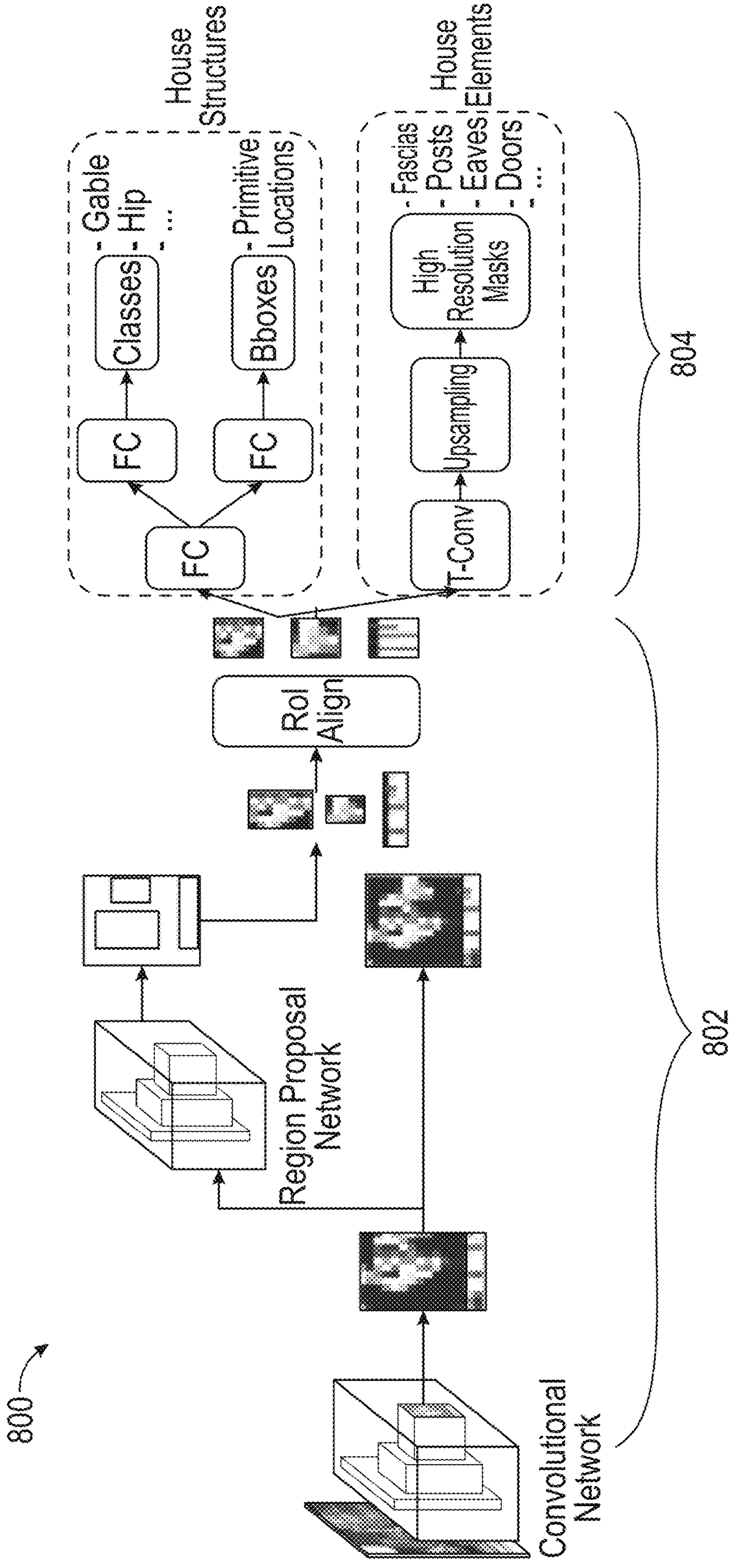
FIGS. 8-9B illustrate grouping operations for identifying sub-structures, according to some embodiments.

FIG. 8 refers to an example neural network, such as a region-based convolutional neural network (R-CNN) 800. Similar in architecture to mask R-CNN, which uses early network heads 802 for region proposal and alignment to a region of interest, the structure R-CNN of FIG. 8 adds additional elements 804 for more specific capabilities, such as grouping. These capabilities may be used for building-specific elements. Whereas traditional mask R-CNN may detect individual elements separately, such as sub-components or features and sub-features of a house, the structure R-CNN may first detect an overall target such as House Structures (primitives like gables and hips associated with a building) and then predict masks for sub-components such as House Elements (fascias, posts, caves, rakes, etc.).

Whereas the House Elements head of network 800 may use a combination of transpose convolution layer and upsampling layer, the House Structures head may use a series of fully connected ('fc') layers to identify structural groupings within an image. This output may be augmented with the House Elements data, or the activation map data from the previously discussed network (e.g., network 802), to produce classified data within a distinct group. In other words, the R-CNN network 800 can discern multiple sub-components or sub-structures within a single parent structure to avoid additional steps to group these subcomponents or sub-structures after detection into an overall target.

The above avoids fitting a bounding box for all primitives or sub-structures and distinguishes to which sub-structure any one architectural feature or architectural sub feature may group. As an example which uses the gable detection as an illustrative use case, the R-CNN network 800 may identify a cluster of architectural features first and then assign them as grouped posts to appropriate rakes to identify distinct sub-structures comprising those features, as opposed to predicting all rakes and posts in an image indicate "gable pixels."

Figure 9A:
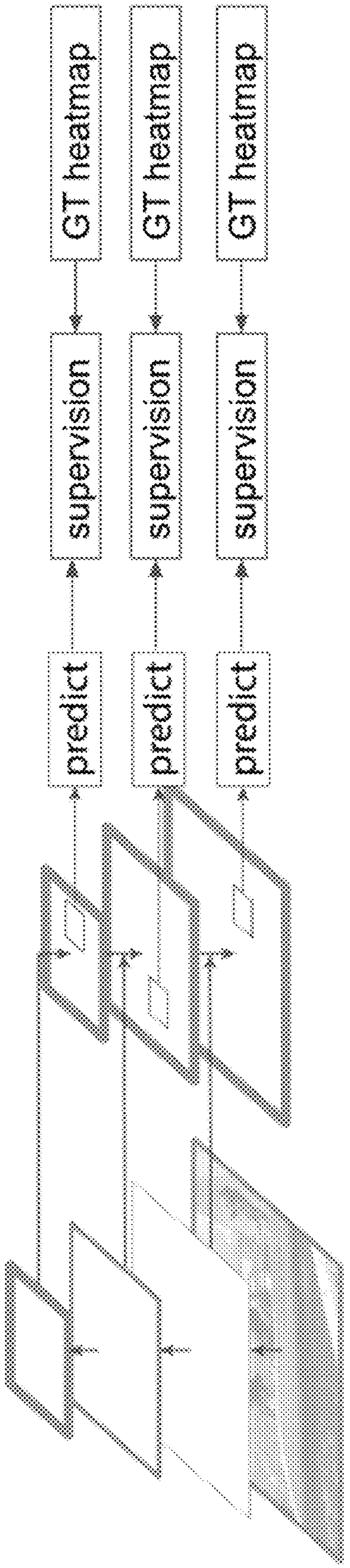
Figure 9B:
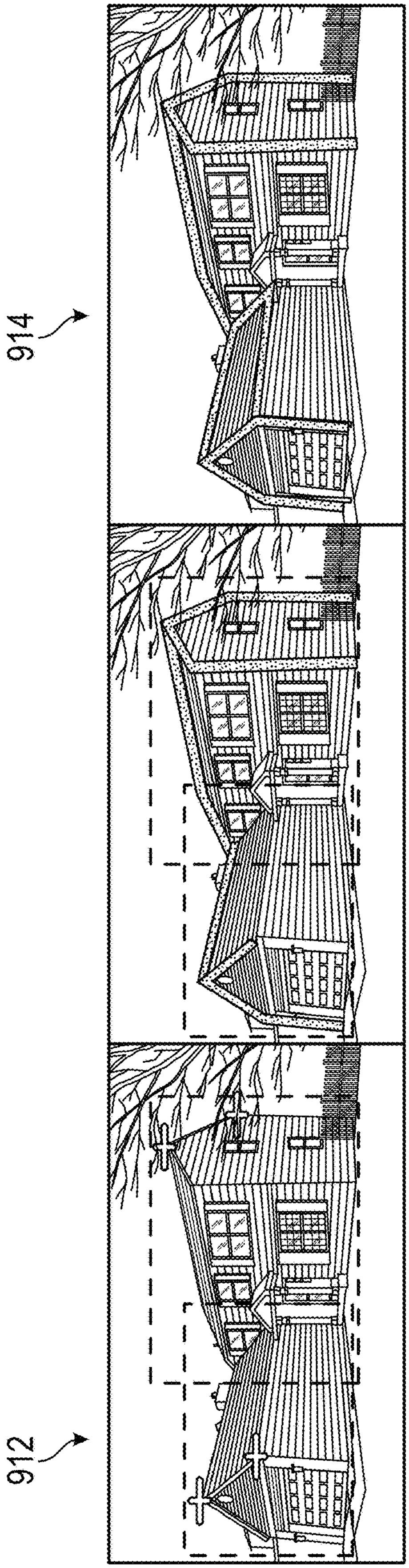
Figure 10A:
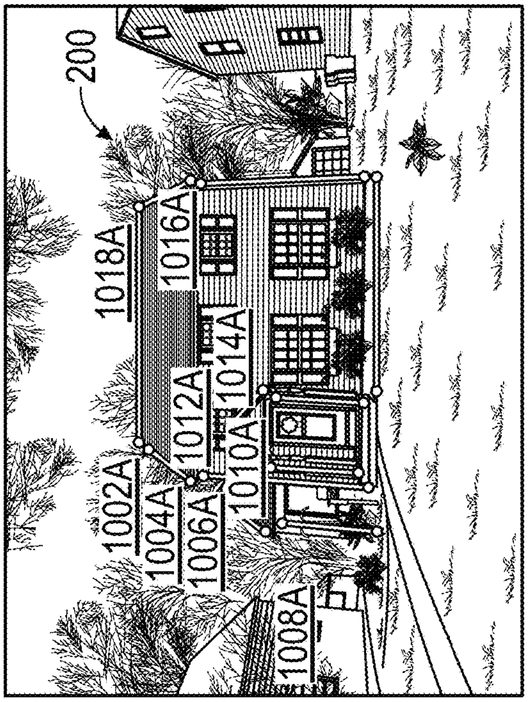
FIGS. 10A-10D illustrate segmented image data of example images, according to some embodiments.
Figure 10B:
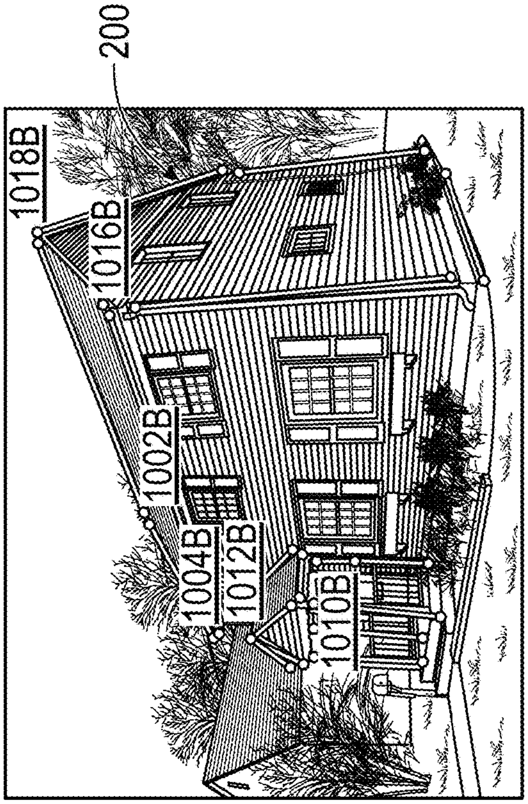
Figure 10C:
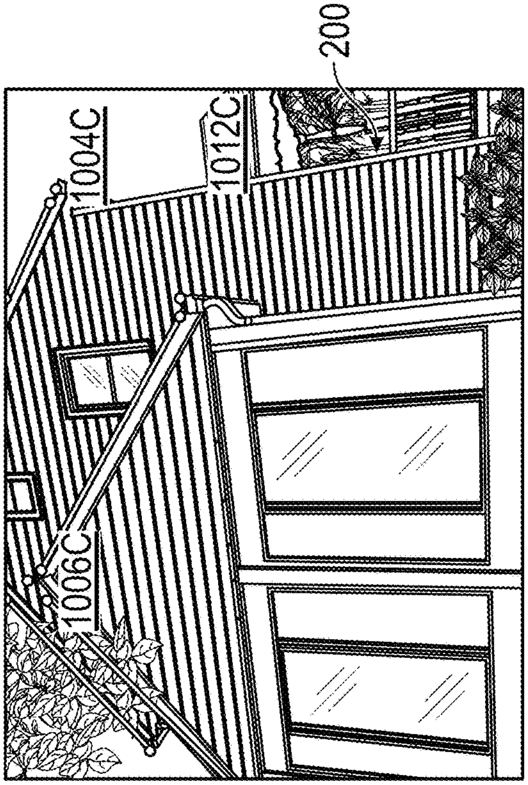
Figure 10D:
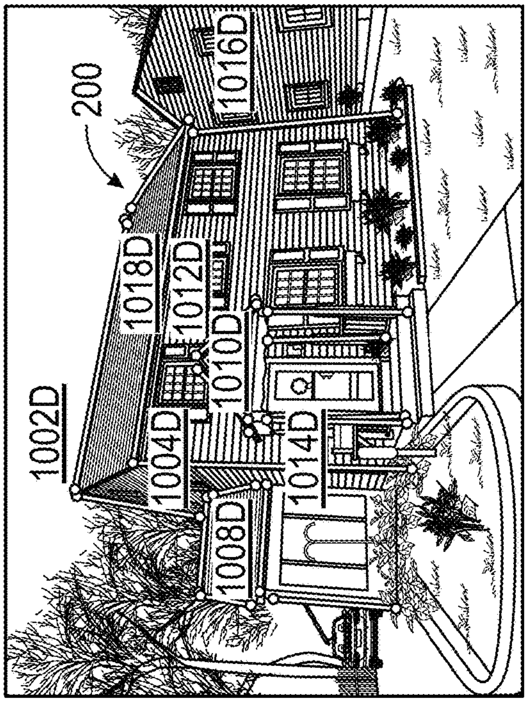

FIG. 9A illustrates a region-specific operation after a grouping is identified within an image, and then segmentation of pixels within the grouping is performed. As a result, regions of sub-structural targets are identified, as in the far-left image 912 of FIG. 9B, and in some embodiments a bounding box may be fit to these grouped sub-structural targets already. Submodules may then classify sub-components or architectural feature or architectural sub-features such as lines and keypoints via segmentation masks of various channels. Lastly, the neural network may also predict masks for architectural features and architectural sub-features per unique sub-structure, as in the far-right image 914 of FIG. 9B. Architectural features or architectural sub-features within a unique region or sub-structure may be indexed to that region to distinguish it from similarly classified elements belonging to separate sub-structures.

FIGS. 10A-10D illustrate segmented image data of example images, according to some embodiments. Each of FIGS. 10A-10D include semantically labeled elements, produced for example by a machine learning model (e.g., a model described above), which describe positions (e.g., points) or segments (e.g., line segments) for classified elements of the building structure 200 within the image data, and associated classes. As described herein, in some embodiments a segment may be determined as extending between two end-points which are semantically labeled. For example, a particular segment (e.g., a ridge line) may be determined based on the machine learning model identifying ridge endpoints associated with the segment.

Specifically, FIGS. 10A-10D illustrate semantically labeled elements including positions including ridge end points and cave end points (labeled with reference numbers in FIGS. 10A-10D) and segments including ridges, rakes, posts, ground lines, and step flashing (not labeled with reference numbers in FIGS. 10A-10D). Points 1002A, 1002B, 1002D, 1006A. 1006C. 1012A, 1012B, 1012C, 1012D, 1018A, 1018B, and 1018D are ridge end points; and points 1004A, 1004B, 1004C, 1004D, 1008A, 1008D, 1010A, 1010B, 1010D, 1014A, 1014D, 1016A, 1016B, and 1016D are cave end points.

Classical feature detection such as scale-invariant feature transform (SIFT), feature from accelerated segment test (FAST), speeded up robust features (SURF), binary robust independent elementary features (BRIEF), oriented FAST and rotated BRIEF (ORB), SuperPoint, or their combinations rely on visual appearance of a particular element, which can substantially change across images and degrade detection and matching. This problem is compounded with wide baseline changes that impart ever increased viewpoint changes of a scene, while introducing additional scene variables like lighting variability in addition to rotation changes. For example, traditional feature detection for a circular object may be trained to identify the center of circle. In this example, as a camera undergoes rotational change the circular object as depicted in one image will gradually be depicted as an oval, then as an ellipse, and finally more like a line in images obtained by the rotating camera. Thus, the feature descriptor becomes weaker and weaker, and false positives more likely, or feature matching may otherwise outright fail. If new visual information, or occluding objects with similar feature appearances as to the feature from the previous frame, were to enter the field of view, the feature matching may be prone to make false positive matches.

Referring back to FIG. 1, at block 106 the system receives or generates camera poses of each image. The camera poses describe the position and orientation of the data capture device at the time of image capture. In some embodiments, the camera poses are determined based on one or more of the images (e.g., the image data, the depth data, or both), the camera intrinsics, and the camera extrinsics. Co-owned U.S. patent application Ser. No. 17/118,370 include disclosure related to determining and scaling camera poses, as well as co-owned International Applications PCT/US20/48263 and PCT/US22/14164, the contents of each are incorporated herein by reference in their entirety.

In some embodiments, the camera poses can be generated or updated based on a point cloud or a line cloud. The point cloud can be generated based on one or more of the images, the camera intrinsics, and the camera extrinsics. The point cloud can represent co-visible points across the images in a three-dimensional (3D) coordinate space. The point cloud can be generated by utilizing one or more techniques, such as, for example, structure-from-motion (SfM), multi-view stereo (MVS), simultaneous localization and mapping (SLAM), and the like. In some embodiments, the point cloud is a line cloud. A line cloud is a set of data line segments in a 3D coordinate space. Line segments can be derived from points using one or more techniques, such as, for example, Hough transformations, edge detection, feature detection, contour detection, curve detection, random sample consensus (RANSAC), and the like. In some embodiments, the point cloud or the line cloud can be axis aligned. For example, the Z-axis can be aligned to gravity, and the X-axis and the Y-axis can be aligned to one or more aspects of the building structure and/or the one or more other objects, such as, for example, walls, floors, and the like.

Referring back to FIG. 1, the system estimates block 108 a three-dimensional (3D) position of each semantically labeled elements. As described in more detail below, with respect to FIG. 11, the system estimates the 3D position based on analyzing all, or a subset of, pairs of the images.

For example, the system obtains a pair of the images. The system determines labeled elements which are included in the pair. For example, the system may identify that a first image of the pair includes an element labeled as a ridge endpoint. As another example, the system may also determine that the remaining image in the pair includes an element labeled as a ridge endpoint. Since these images are from different vantage points, and indeed may even depict the building from opposite views (e.g., a front view and a back view), the system identifies whether these elements correspond to the same real-world element in 3D space. As will be described below, for example in FIGS. 12A-12B, epipolar geometry techniques may be used to identify whether these elements correspond to the same real-world element. Based on satisfying epipolar geometry constraints, the 3D position of the real-world element may be determined based on the pair of images and camera properties (e.g., intrinsic, extrinsic, parameters associated with the pair).

While the above-described pair of images may be used to determine a 3D position for a real-world element, the system may determine distinct 3D positions for this element when analyzing remaining pairs of images. For example, a different pair of images may include the semantic label and based on epipolar geometry a 3D position of the element may be determined. This 3D position may be different, for example slightly different in a 3D coordinate system, as compared to the 3D position determined using the above-described pair of images. In other words, a plurality of image pairs may produce a plurality of candidate 3D positions for the same element. Variability in candidate 3D positions may be the result of variability or error in the 2D position of the segmented element as from step 104, or errors in the camera poses as from step 106, or a combination of the two that would lead to variability in the epipolar matching.

To select a robust candidate 3D position, the system uses a reprojection score associated with each of the 3D positions determined for a real-world element. With respect to a first pair of images, the system determines a first 3D position. Using camera properties, the first 3D position may be projected onto remaining images that observe the same classified element. The difference between the projected location in each remaining image and the location in the remaining image of the element may represent a reprojection error. The sum, or combination, of these reprojection errors for the remaining images may indicate the reprojection score associated with the first 3D position. Subsequently, all, or a subset of, the remaining image pairs that observe the element are similarly analyzed to determine reprojection errors associated with their resultant 3D positions. The 3D position with the lowest reprojection score may be selected as the 3D position of the element.

Figure 11:
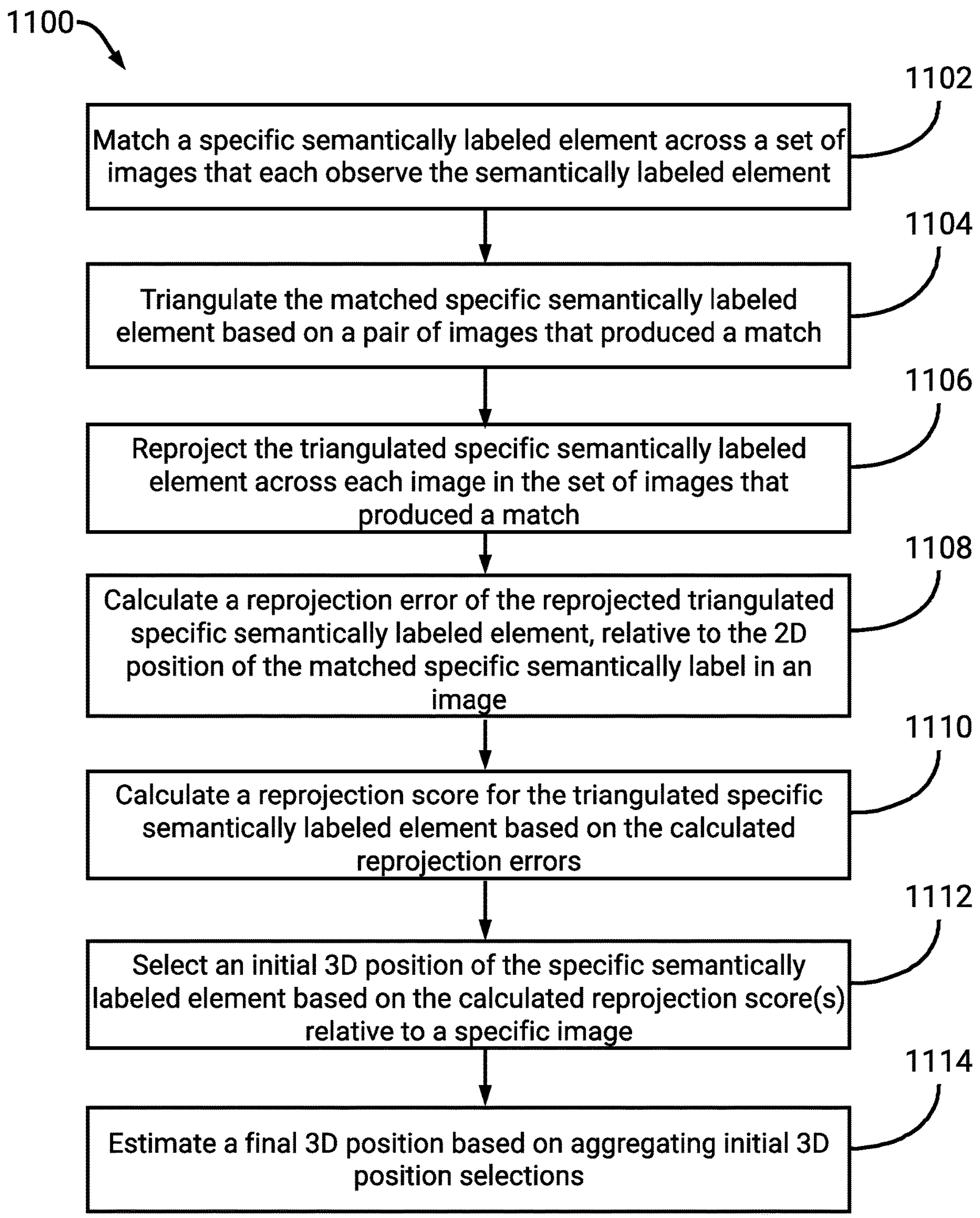
FIG. 11 is a flowchart of an example process for estimating 3D positions of semantically labeled elements, according to some embodiments.

FIG. 11 is a flowchart of an example process 1100 for estimating 3D positions of semantically labeled elements, according to some embodiments. For convenience, the process 1100 will be described as being performed by a system of one or more computers or a system of one or more processors.

At block 1102, the system matches a semantically labeled element in one image with elements associated with the same semantic label in at least one other image of a set of images. In some examples, a semantically labeled element is matched by finding the similarly labeled element in the at least one other image that conforms to an epipolar constraint. In some examples, an initial single image is selected. At least one other image that observes a specific semantically labeled element in common with the selected initial image is then sampled with the initial image for this analysis.

Figure 12A:
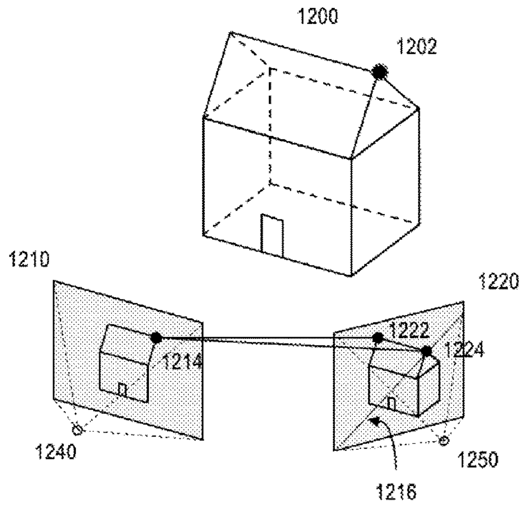
FIGS. 12A and 12B illustrate an example of using epipolar constraints of semantically labeled elements across images, according to some embodiments.
Figure 12B:
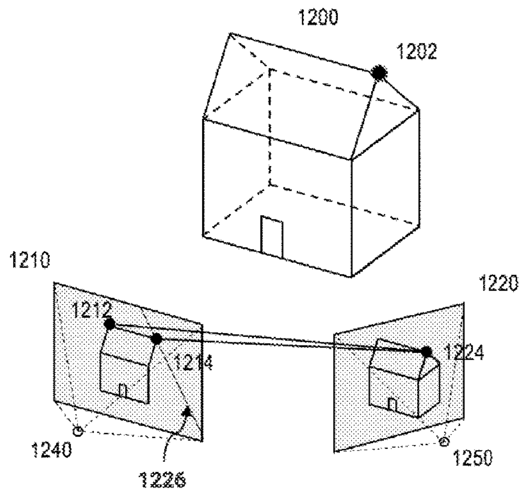
Figures 13A, 13B, 13C, 13D:
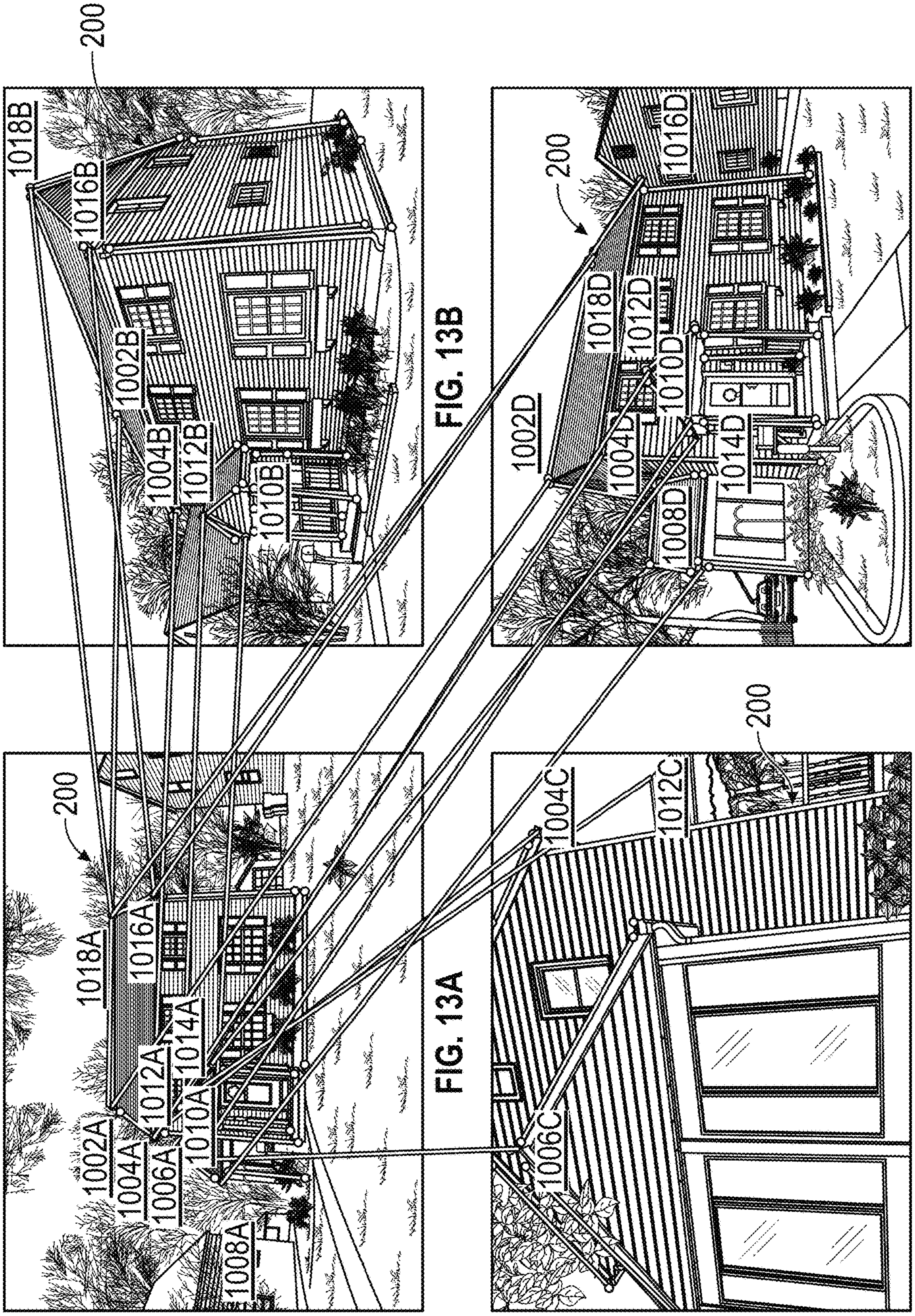
FIGS. 13A-13D illustrate viewpoint invariant based matching according to some embodiments.

Reference will now be made to FIGS. 12A-12B.

FIGS. 12A-12B illustrate an example of using epipolar constraints of semantically labeled elements across images for viewpoint invariant descriptor-based matching, according to some embodiments. As illustrated, a set of images including at least a first image 1210 and a second image 1220 depict ridge end points of a building 1200.

FIG. 12A illustrates an example ridge end point 1214. Using camera parameters, such as camera positions 1240 and 1250 (e.g., camera centers), for the first image 1210 and the second image 1220, respectively, an epipolar line 1216 is projected for the second image 1220. Though the second image 1220 depicts two ridge end points, 1222 and 1224, the epipolar line intersects only 1224. Thus, ridge end point 1214 may be determined to match with ridge end point 1224. To ensure an appropriate match, in some examples ridge end point 1224 may also be used to validate with an epipolar match to ridge endpoint 1214. This may help to reduce false positives of matches. For example, false positive may result from buildings which include a plethora of architectural features, and which therefore are associated with dense semantically labeled elements in any one image.

FIG. 12B illustrates an example of matching between ridge endpoint 1224 in the second image 1220 with either ridge endpoint 1214 or ridge endpoint 1212. For example, ridge endpoints 1212, 1214, may be classified via a machine learning model as described herein. Thus, epipolar constraints are used to determine that ridge endpoint 1224 matches with ridge endpoint 1214. For example, an epipolar line 1226 for ridge endpoint 1224 may be projected into the first image 1210. As illustrated, the epipolar line 1226 intersects ridge end point 1214 but not ridge end point 1212. Mutual epipolar best matches, such as depicted by FIGS. 12A and 12B provide higher confidence or validation that elements are correctly matched, or correctly labeled. For example, if epipolar line 1216 did not intersect with an element that was similarly labeled, then the system may remove the semantic classification of that element in either image.

Viewpoint invariant descriptor-based matching as described herein enables feature matching across camera pose changes which traditional feature matching, such as use of appearance-based matching (e.g., descriptor matching), is inaccurate. For example, using viewpoint invariant descriptor-based matching an element of a roof which is depicted in an image of the front of a building may be matched with that element as depicted in a different image of the back of the building. Because traditional descriptors use appearance-based matching, and as the perspective and scene information changes with the camera pose change, the confidence of traditional feature matching drops and detection and matching reduces or varies. An element that is objectively the same may look quite different in images given the different perspectives or lighting conditions or neighbor pixel changes. Semantically labeled elements, on the other hand, obviate these-appearance based variables by employing consistent labeling regardless of variability in appearance. Using secondary localization techniques for matching, such as epipolar constraints or mutual epipolar constraints, tightens the reliability of the match.

In some examples, the density of similarly labeled semantically labeled elements may result in a plurality of candidate matches which fall along, or which are close to, an epipolar line. In some examples, a semantically labeled element with the shortest distance to the epipolar line (e.g., as measured by the pixel distance of the image on which the epipolar line is projected) is selected as the matching element. The selection of a candidate match may therefore, as an example, be inversely proportional to a distance metric from an epipolar line. While equidistant candidate matches may occur, the mutual epipolar constraint of multiple candidates facilitates identifying a single optimized match among a plurality of candidate matches, in addition to the false positive filtering the mutual constraint already imposes.

FIGS. 13A-13D illustrate use of the techniques described herein to match elements between images. For example, the images represented in FIGS. 13A-13D graphically illustrate matches between elements illustrated in FIGS. 10A-10D. As illustrated, a match between roof apex point 1006A in FIG. 13A and roof apex point 1006C in FIG. 13C. Additionally matches between building-specific elements are illustrated in FIGS. 13A-13D.

In some embodiments, the system determines element matches between each pair, or greater than a threshold number of pairs, of images. Thus, the system may identify each image which depicts a particular element. For example, a particular roof apex may be depicted in a subset of the images. In this example, the images may be paired with each other. The system may determine that the roof apex is depicted in a first pair that includes a first image and a second image. Subsequently, the system may determine that the roof apex is depicted in a second pair which includes the first image and a third image. This process may continue such that the system may identify the first image, second image, third image, and so on, as depicting the roof apex. The system may therefore obtain information identifying a subset of the set of images which depict the element.

Returning to FIG. 11, at block 1104 the system triangulates the matched element according to a particular pair from the set of images that depict that specific semantically labeled element (e.g., a particular pair from the subset of the set of images which depict the element). For example, the system generates a 3D position associated with the element. As known by those skilled in the art, the 2D positions of the element in the images may be used to determine a 3D position. In some embodiments, a pair of images may be used as. For these embodiments, the 3D position may be determined based on respective 2D image positions and camera properties (e.g., intrinsic, extrinsic, camera parameters).

The 3D position of the element determined in block 1104, which may be determined using a pair of the images, may then be reprojected into the remaining of the subset of the set of images at block 1106. For example, using camera properties associated with the remaining images the system identifies a location in the remaining images which correspond to the 3D position.

At block 1108, the system calculates a reprojection error for each identified image with a reprojected triangulated position. In some examples, the reprojection error is calculated based on a Euclidean distance between the pixel coordinates of the 2D position of the specific semantically labeled element in the image and a 2D position of the reprojected triangulated specific semantically labeled element in the image. As described herein, the 2D position may refer to a particular pixel associated with a semantic label. The 2D position may also refer to a centroid of a bounding box positioned about a portion of an image associated with a semantic label.

With respect to the above, the difference between the projected 2D position and the 2D position of the element may represent the reprojection error. Difference may be determined based on a number of pixels separating the projected 2D position and the semantically labeled 2D position of the element (e.g., a number of pixels forming a line between the positions).

At block 1110, the system calculates a reprojection score for the triangulated specific semantically labeled element based on the calculated reprojection errors. Calculating the reprojection score can include summation of the reprojection errors across all images in the set of images.

In some embodiments, blocks 1104 through 1110 are then repeated by pairing every other image of images that can view a specific semantically labeled element with the initial selected image (e.g., the blocks may be performed iteratively). For example, if the system initially identified at block 1102 that three images produced a match for specific semantically labeled elements and blocks 1104 through 1110 were performed for a first and second image, then the process is repeated using the first and third image.

At block 1112, the system selects an initial 3D position of the specific semantically labeled element based on the aggregate calculated reprojection scores. This produces the triangulation with the lowest reprojection error, relative to an initial image only. Even though the triangulated point was reprojected across images and each image was eventually paired with the initial image through the iteration of blocks 1102 through 1110, the initial image may be understood to be the common denominator for the pairing and triangulation resulting in that initial 3D position.

In some examples, blocks 1104 through 1112 are further repeated selecting a second image in the image set that observes the semantically labeled element. The triangulation and reprojection error measurements are then performed again to produce another initial 3D position relative to that specific image. This iteration of blocks continues until each image has been used as the base image for analysis against all other images. This process of RANSAC-inspired sampling produces robust estimation of 3D data using optimization of only a single image pair. This technique overcomes the more computationally resource heavy bundle adjustment and its use of gradient descent to manage reprojection errors of several disparate points across many camera views.

Blocks 1102 through 1112 may produce multiple initial selections for 3D positions for the same specific semantically labeled element. In some embodiments, the multiple selections of initial 3D positions can be reduced to a single final 3D position at block 1114, such as via clustering. For example, the cumulative initial 3D positions are collapsed into a final 3D position. The final 3D position/point can be calculated based on the mean of all the initial 3D positions for a semantically labeled element or based on only those within a predetermined distance of one another in 3D space.

In some examples, rather than produce a series of initial 3D positions based on a common denominator image and aggregating into a final 3D position, process 1100 culminates with selecting a single image pair that produces the lowest reprojection score.

For example, in some examples if there are four images that observe a particular apex point, process 1100 may be run to determine which image, when paired with a first image, produces the lowest reprojection error among the other images; then the sequence is repeated to determine which image when paired with the second image produces the lowest reprojection error; and so on with the third and fourth images and the triangulated points from each iteration is aggregated into a final position. In some examples, rather than leverage a plurality of initial 3D positions from multiple image pairs, only the image pair among those four images that produces the lowest reprojection score among any other image pairs is selected.

Returning to FIG. 1, at block 110 the system generates a 3D building model based on the estimated 3D positions of each semantically labeled element. In some examples, the estimated 3D position is the final 3D position as determined by process 1100. In some embodiments, generating the 3D building model can include associating the semantically labeled elements based on known constraints for architectural features. For example, ridge end points are connected by ridge lines, rakes are lines in between cave end points and ridge end points. In some embodiments, associating the semantically labeled elements can include connecting the 3D positions of the semantically labeled elements with line segments.

In some embodiments, the 3D positions of the semantically labeled elements are connected based on associated classes and geometric constraints related to the associated classes. Examples of geometric constraints include: rake lines connecting ridge end points with eave end points; ridge lines connecting ridge end points; rake lines being neither vertical nor horizontal; cave lines or ridge lines being aligned to a horizontal axis; or eave lines being parallel or perpendicular to other eave lines. In this way, 3D lines are produced from the 3D data of its associated semantically labeled element(s).

In some embodiments, generating the 3D model can include determining one or more faces based on the associated semantically labeled elements. The faces can be polygons, such as, for example, rectangles. In some embodiments, the faces can be determined based on the line segments connecting the semantically labeled elements. In some embodiments, the faces can be determined utilizing polygon surface approximation techniques, for example with the 3D positions of the semantically labeled elements and associated classes as input. In some embodiments, determining the faces can include deduplicating overlapping faces, for example, based on the 3D position of the faces.

In some embodiments, determining the faces can include calculating a score for each face, where the score is based on the number of multiple estimated final 3D positions for the same specific semantically labeled element that correspond to the vertices of the faces. For example, a cluster size can be determined based on the number of multiple estimated final 3D positions for the same specific semantically labeled element, and the score for a face can be calculated as the sum of the cluster sizes associated with the semantically labeled elements that are the vertices of the face.

In some embodiments, generating the 3D building model can include determining a set of mutually consistent faces based on the one or more faces. The set of mutually consistent faces includes faces that are not inconsistent with one another. Faces in a pair of faces are consistent with each other if the faces share an edge, do not overlap, and do not intersect. The set of mutually consistent faces can be determined based on pairwise evaluation of the faces to determine consistency (or inconsistency) between the faces in the pair of faces. In some embodiments, generating the 3D building model can include determining a maximally consistent set of mutually consistent faces based on the set of mutually consistent faces. The maximally consistent set of mutually consistent faces is a subset of the set of mutually consistent faces that maximize the scores of the faces.

In some embodiments, generating the 3D building model can include generating one or more measurements related to the 3D building model. In some embodiments, the measurements can be generated based on one or more of the associations of the semantically labeled elements and the faces. The measurements can describe lengths of to the line segments connecting the semantically labeled elements, areas of the faces, and the like.

In some embodiments, generating the 3D building model can include scaling the 3D building model. In some embodiments, the 3D building model is correlated with an orthographic (top down) scaled image of the building structure, and the 3D building model is scaled based on the correlated orthographic image. For example, at least two vertices of the 3D building model are correlated with at least two points of the orthographic image, and the 3D building model is scaled based on the correlated orthographic image. In some embodiments, the 3D building model is correlated with a scaled oblique image of the building structure, and the 3D building model is scaled based on the correlated oblique image. For example, at least two vertices of the 3D building model are correlated with at least two points of the oblique image, and the 3D building model is scaled based on the correlated oblique image.

Figure 14:
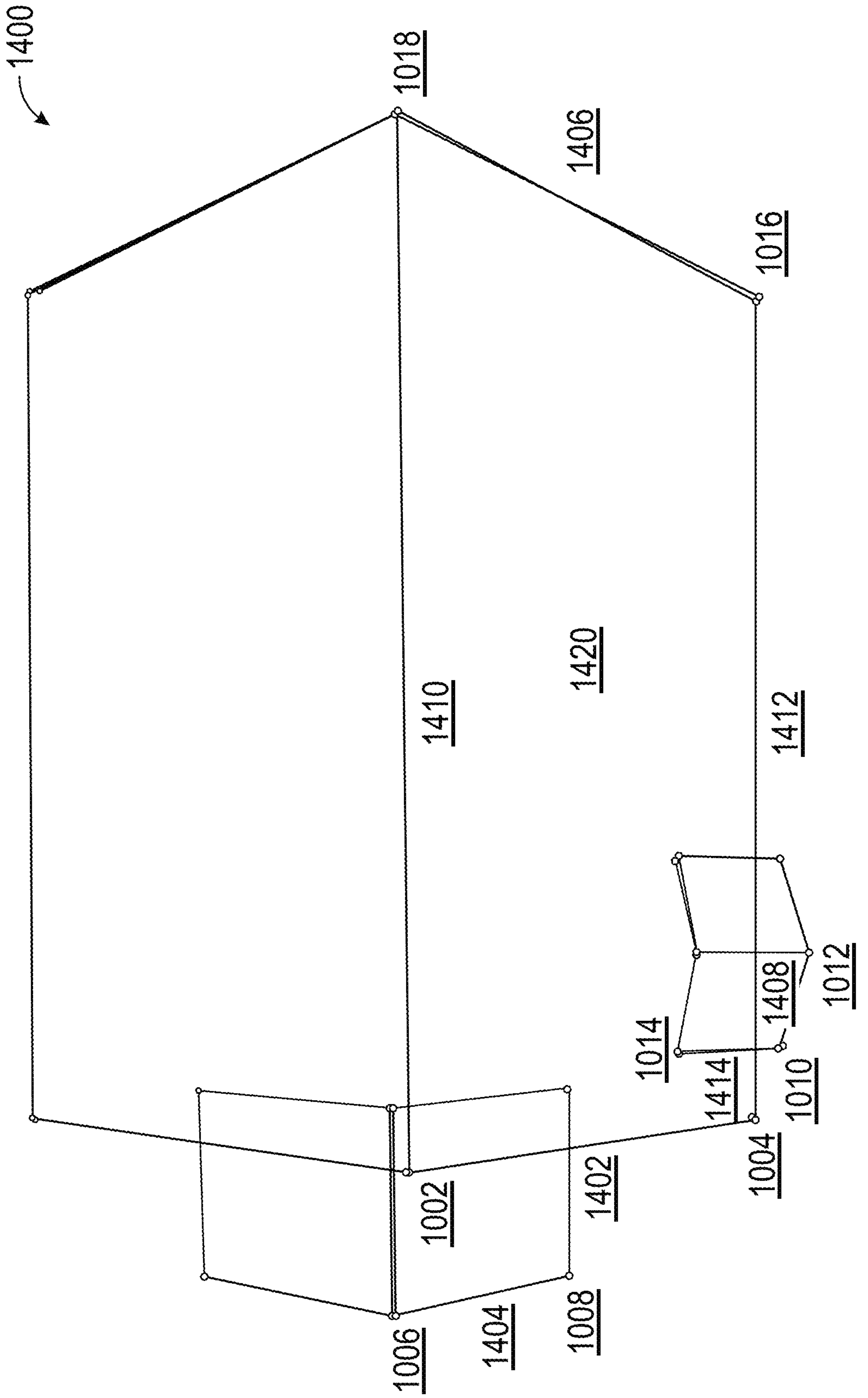
FIG. 14 illustrates an orthogonal view of a 3D building model of a building structure generated from selectively reprojected viewpoint invariant matches according to some embodiments.

FIG. 14 illustrates an orthogonal view of a 3D building model 1400 of a building structure generated from selectively reprojected viewpoint invariant matches of semantically labeled elements according to some embodiments. The 3D building model 1400 can be generated based on the estimated 3D positions of each semantically labeled element, for example by associating the semantically labeled elements based on mutually constraining epipolar matches. The ridge end point 1002 can be connected with the cave end point 1004 with a rake line 1402; the ridge end point 1006 can be connected with cave end point 1008 with a rake line 1404; the ridge end point 1018 can be connected with the cave end point 1016 with a rake line 1406; the ridge end point 1012 can be connected with the cave end point 1010 with a rake line 1408; the ridge end point 1002 can be connected with the ridge end point 1018 with a ridge line 1410; the cave end point 1004 can be connected with cave end point 1016 with an cave line 1412; and the cave end point 1010 can be connected with cave end point 1014 with an cave line 1414. A roof face 1420 can be determined based on the ridge end points 1002 and 1018, the cave end points 1004 and 1016, the rake lines 1402 and 1406, the ridge line 1410, and the cave line 1412.

In some embodiments, the 3D building model (e.g., 3D representation), or portion thereof (e.g., roof), may be output in a user interface presented to a user. For example, an application may be executed via a user device of the user. In this example, the application may be used to present the model and associated measurements. Additionally, measurements may be derived based on the model such as the pitch of each roof facet, or the area of the roof facet. Pitch may represent the rise over run of the roof face and may be determined based on the model, e.g., by calculating the change in elevation of the roof facet per unit of lateral distance. As an example, calculating the rise may include calculating the change in elevation of the roof facet (e.g., from its lowest to its highest point) and calculating the run may include calculating the distance the roof facet extends in a horizontal (x or y-axis) direction, with the rise and run forming the sides of a triangle and with the surface of the facet forming the hypotenuse. In some embodiments, the area may be calculated from measurements of the distance that each side of the facet extends. In some embodiments, the pitch and/or area of each roof facet may be presented in the user interface, for example positioned proximate to the roof facet in the model.

Figure 15:
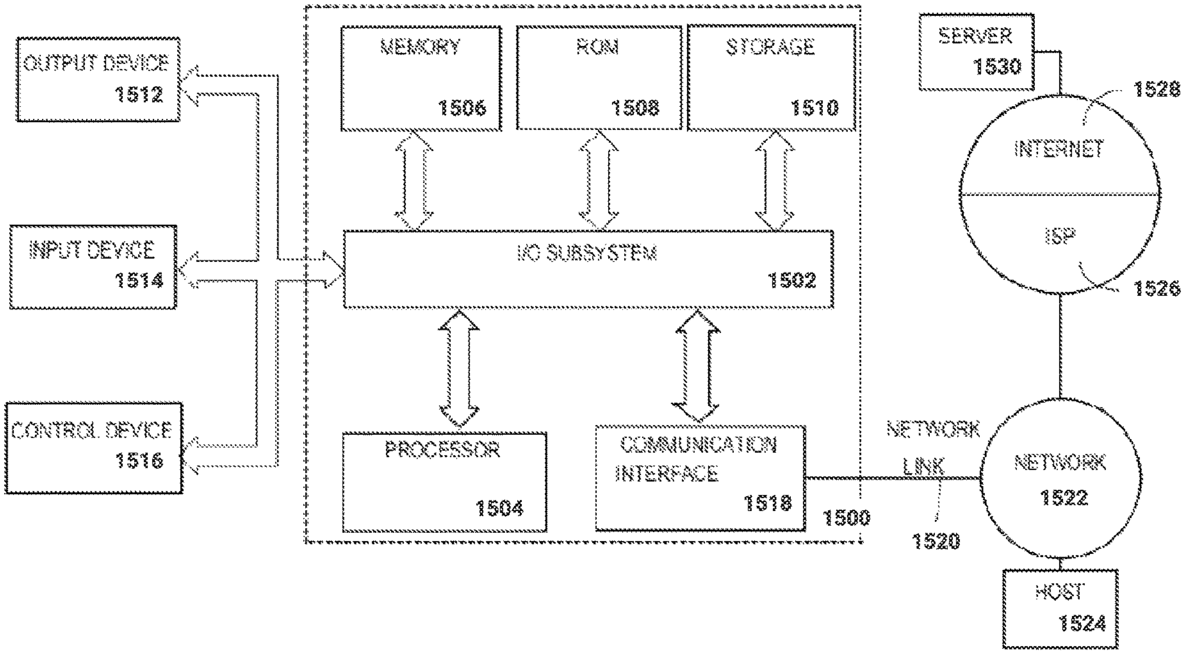
FIG. 15 is a block diagram illustrating a computer system that may be used to implement the techniques described herein according to some embodiments.

FIG. 15 illustrates a computer system 1500 configured to perform any of the steps described herein. Computer system 1500 includes a I/O Subsystem 1502 or other communication mechanism for communicating information, and a hardware processor, or multiple processors, 1504 coupled with I/O Subsystem 1502 for processing information. Hardware processor(s) 1504 may be, for example, one or more general purpose microprocessors.

Computer system 1500 also includes a main memory 1506, such as a random access memory (RAM), cache and/or other dynamic storage devices, coupled to I/O Subsystem 1502 for storing information and instructions to be executed by processor 1504. Main memory 1506 also may be used for storing temporary variables or other intermediate information during execution of instructions to be executed by processor 1504. Such instructions, when stored in storage media accessible to processor 1504, render computer system 1500 into a special-purpose machine that is customized to perform the operations specified in the instructions.

Computer system 1500 further includes a read only memory (ROM) 1508 or other static storage device coupled to I/O Subsystem 1502 for storing static information and instructions for processor 1504. A storage device 1510, such as a magnetic disk, optical disk, or USB thumb drive (Flash drive), etc., is provided and coupled to I/O Subsystem 1502 for storing information and instructions.

Computer system 1500 may be coupled via I/O Subsystem 1502 to an output device 1512, such as a cathode ray tube (CRT) or LCD display (or touch screen), for displaying information to a computer user. An input device 1514, including alphanumeric and other keys, is coupled to I/O Subsystem 1502 for communicating information and command selections to processor 1504. Another type of user input device is control device 1516, such as a mouse, a trackball, or cursor direction keys for communicating direction information and command selections to processor 1504 and for controlling cursor movement on output device 1512. This input device typically has two degrees of freedom in two axes, a axis (e.g., x) and a second axis (e.g., y), that allows the device to specify positions in a plane. In some embodiments, the same direction information and command selections as cursor control may be implemented via receiving touches on a touch screen without a cursor.

Computing system 1500 may include a user interface module to implement a GUI that may be stored in a mass storage device as computer executable program instructions that are executed by the computing device(s). Computer system 1500 may further, as described below, implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor(s) 1504 executing one or more sequences of one or more computer readable program instructions contained in main memory 1506. Such instructions may be read into main memory 1506 from another storage medium, such as storage device 1510. Execution of the sequences of instructions contained in main memory 1506 causes processor(s) 1504 to perform the process steps described herein. In alternative embodiments, hard-wired circuitry may be used in place of or in combination with software instructions.

Various forms of computer readable storage media may be involved in carrying one or more sequences of one or more computer readable program instructions to processor 1504 for execution. For example, the instructions may initially be carried on a magnetic disk or solid-state drive of a remote computer. The remote computer can load the instructions into its dynamic memory and send the instructions over a telephone line, cable, using a modem (or optical network unit with respect to fiber). A modem local to computer system 1500 can receive the data on the telephone line and use an infra-red transmitter to convert the data to an infra-red signal. An infra-red detector can receive the data carried in the infra-red signal and appropriate circuitry can place the data on I/O Subsystem 1502. I/O Subsystem 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to I/O Subsystem 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN (or WAN component to communicated with a WAN). Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world-wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor 1504 as it is received, and/or stored in storage device 1510, or other non-volatile storage for later execution.

Other Implementations

All of the processes described herein may be embodied in, and fully automated, via software code modules executed by a computing system that includes one or more computers or processors. The code modules may be stored in any type of non-transitory computer-readable medium or other computer storage device. Consequently, various electronic storage media discussed herein may be understood to be types of non-transitory computer readable media in some implementations. Some or all the methods may be embodied in specialized computer hardware.

Many other variations than those described herein will be apparent from this disclosure. For example, depending on the implementation, certain acts, events, or functions of any of the algorithms described herein can be performed in a different sequence or can be added, merged, or left out altogether (for example, not all described acts or events are necessary for the practice of the algorithms). Moreover, in certain implementations, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and engines described in connection with the implementations disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another implementation, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain implementations require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the implementations described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a processor configured to carry out recitation A working in conjunction with a second processor configured to carry out recitations B and C.

It should be emphasized that many variations and modifications may be made to the above-described implementations, the elements of which are to be understood as being among other acceptable examples. All such modifications and variations are intended to be included herein within the scope of this disclosure.

What is claimed is:

1. A method for generating three-dimensional data, the method comprising:

obtaining a plurality of images depicting an object, wherein each image of the plurality of images is taken at an individual position about the object;

obtaining for each image of the plurality of images, via a machine learning model, semantic labels describing one or more elements of the object, wherein the semantic labels are associated with two-dimensional positions in the plurality of images;

estimating three-dimensional positions for the one or more elements, wherein estimating a three-dimensional position of a respective element is based on extrinsic camera properties of a selected image pair from the plurality of images and a reprojection error associated with the respective element in an image from the plurality of images other than the selected image pair, wherein the respective element is associated with a first semantic label, and wherein the selected image pair comprises a first image and a second image selected based on determining that a first two-dimensional position associated with the first semantic label in the first image satisfies a first epipolar constraint of the second image and that a second two-dimensional position associated with the first semantic label in the second image satisfies a second epipolar constraint of the first image; and generating a three-dimensional representation of at least a portion of the object based on the estimated one or more three-dimensional positions.

2. The method of claim 1, and wherein estimating the three-dimensional position of the respective element comprises:

obtaining a subset of images from the plurality of images, wherein the semantic label was obtained for each image of the subset; and generating, based on the first epipolar constraint and the second epipolar constraint, a plurality of image pairs from the subset of images.

3. The method of claim 2, further comprising:

iteratively triangulating a three-dimensional position of the element based on iteratively selected image pairs from the plurality of image pairs;

reprojecting each iteratively triangulated three-dimensional position into each image of the subset of images; and calculating a reprojection score for each selected image pair.

4. The method of claim 3, wherein the reprojection score comprises a combination of reprojection errors for a triangulated three-dimensional position in each image of the subset of images, wherein the reprojection error in an image of the subset of images is a positional difference between a triangulated three-dimensional position of the element reprojected onto the image of the subset of images and a two-dimensional position of the semantic label in the image of the subset of images.

5. The method of claim 3, wherein the estimated three-dimensional position of the element is a triangulated three-dimensional position of the element that produced the lowest reprojection score.

6. The method of claim 1, further comprising generating additional three-dimensional semantic geometries based on geometrical constraints associated with a particular semantic label.

7. One or more non-transitory storage media storing instructions that when executed by a system of one or more processors, cause the processors to perform operations comprising:

obtaining a plurality of images depicting an object, wherein each image of the plurality of images is taken at an individual position about the object;

obtaining for each image of the plurality of images, via a machine learning model, semantic labels describing one or more elements of the object, wherein the semantic labels are associated with two-dimensional positions in the plurality of images;

estimating three-dimensional positions for the one or more elements, wherein estimating a three-dimensional position of a respective element is based on extrinsic camera properties of a selected image pair from the plurality of images and a reprojection error associated with the element in an image from the plurality of images other than the selected image pair, wherein the element in a first image of the selected image pair satisfies a first epipolar constraint of a second image of the selected image pair, and the element in the second image satisfies a second epipolar constraint of the first image; and generating a three-dimensional representation of at least a portion of the object based on the estimated one or more three-dimensional positions.

8. The one or more non-transitory storage media of claim 7, wherein estimating the three-dimensional position of the respective element comprises:

obtaining a subset of images from the plurality of images, wherein the semantic label was obtained for each image of the subset; and generating, based on the first epipolar constraint and the second epipolar constraint, a plurality of image pairs from the subset of images.

9. The one or more non-transitory storage media of claim 8, further comprising:

iteratively triangulating a three-dimensional position of the element based on iteratively selected image pairs from the plurality of image pairs;

reprojecting each iteratively triangulated three-dimensional position into each image of the subset of images; and calculating a reprojection score for each selected image pair.

10. The one or more non-transitory storage media of claim 9, wherein the reprojection score comprises a combination of reprojection errors for a triangulated three-dimensional position in each image of the subset of images, wherein the reprojection error in an image of the subset of images is a positional difference between a triangulated three-dimensional position of the element reprojected onto the image of the subset of images and a two-dimensional position of the semantic label in the image of the subset of images.

11. The one or more non-transitory storage media of claim 9, wherein the estimated three-dimensional position of the element is a triangulated three- dimensional position of the element that produced the lowest reprojection score.

12. The one or more non-transitory storage media of claim 7, further comprising generating additional three-dimensional semantic geometries based on geometrical constraints associated with a particular semantic label.

13. A method for generating three-dimensional data, the method comprising:

obtaining a plurality of images depicting an object, wherein each image of the plurality of images is taken at an individual position about the object;

obtaining for each image of the plurality of images, via a machine learning model, semantic labels describing one or more elements of the object, wherein the semantic labels are associated with two-dimensional positions in the plurality of images;

estimating three-dimensional positions for the one or more elements, wherein estimating a three-dimensional position of a respective element is based on extrinsic camera properties of a selected image pair from the plurality of images and a reprojection error associated with the element in an image from the plurality of images other than the selected image pair, wherein the reprojection error is based on a positional difference between the element triangulated to a three-dimensional position by the selected image pair and reprojected into the other image with a two-dimensional position of the element in the other image; and generating a three-dimensional representation of at least a portion of the object based on the estimated one or more three-dimensional positions.

14. The method of claim 13, wherein the element is associated with a semantic label, and wherein estimating the three-dimensional position of the element comprises:

obtaining a subset of images from the plurality of images, wherein the semantic label was obtained for each image of the subset; and generating, based on epipolar constraints, a plurality of image pairs from the subset of images.

15. The method of claim 14, further comprising:

iteratively triangulating a three-dimensional position of the element based on iteratively selected image pairs from the plurality of image pairs;

reprojecting each iteratively triangulated three-dimensional position into each image of the subset of images; and calculating a reprojection score for each selected image pair.

16. The method of claim 15, wherein the reprojection score comprises a combination of reprojection errors for an iteratively triangulated three-dimensional position across the images of the subset of images.

17. The method of claim 15, wherein the estimated three-dimensional position of the element is a triangulated three-dimensional position of the element that produced the lowest reprojection score.

18. The method of claim 15, further comprising clustering a plurality of candidate three-dimensional positions for the element into a final three-dimensional position, wherein the final three-dimensional position is based on a mean of candidate three-dimensional positions that are within a predetermined distance of one another in three-dimensional space.

19. The method of claim 13, further comprising generating additional three-dimensional semantic geometries based on geometrical constraints associated with a particular semantic label.

20. The method of claim 13, wherein generating the three-dimensional representation comprises connecting estimated three-dimensional positions of the one or more elements with line segments based on geometric constraints associated with the semantic labels.

* * * * *